United States Patent
Kurata et al.

(10) Patent No.: US 11,418,763 B2
(45) Date of Patent: Aug. 16, 2022

(54) LIGHT SOURCE APPARATUS AND IMAGE PROJECTION APPARATUS

(71) Applicant: CANON KABUSHIKI KAISHA, Tokyo (JP)

(72) Inventors: Yuya Kurata, Utsunomiya (JP); Hiroshi Yamamoto, Ageo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/548,035

(22) Filed: Aug. 22, 2019

(65) Prior Publication Data

US 2020/0068180 A1 Feb. 27, 2020

(30) Foreign Application Priority Data

Aug. 27, 2018 (JP) .............................. JP2018-158593

(51) Int. Cl.
*H04N 9/31* (2006.01)

(52) U.S. Cl.
CPC ......... *H04N 9/3164* (2013.01); *H04N 9/3144* (2013.01); *H04N 9/3197* (2013.01)

(58) Field of Classification Search
CPC ...... G03B 21/16; G03B 21/28; G03B 21/204; G03B 21/206; G03B 21/208; G03B 21/2013; G03B 21/2033; G03B 21/2053; H04N 9/315; H04N 9/3114; H04N 9/3144; H04N 9/3155; H04N 9/3158; H04N 9/3161; H04N 9/3164; H04N 9/3197
See application file for complete search history.

(56) References Cited

U.S. PATENT DOCUMENTS

| | | | |
|---|---|---|---|
| 9,888,220 B2 | 2/2018 | Chikahisa | |
| 10,545,331 B2* | 1/2020 | Takamatsu | G02B 17/023 |
| 2001/0013924 A1* | 8/2001 | Yokoyama | G03B 21/16 |
| | | | 353/52 |
| 2005/0201107 A1* | 9/2005 | Seki | H04N 9/3144 |
| | | | 362/373 |
| 2009/0237622 A1* | 9/2009 | Nishioka | H04N 9/3129 |
| | | | 353/85 |
| 2010/0103088 A1* | 4/2010 | Yokoyama | G02F 1/3775 |
| | | | 372/22 |

(Continued)

FOREIGN PATENT DOCUMENTS

| | | |
|---|---|---|
| CN | 104345528 A | 2/2015 |
| CN | 107831631 A | 3/2018 |

(Continued)

OTHER PUBLICATIONS

Office Action issued in Chinese Appln. No. 201910799332.3 dated May 25, 2021. English translation provided.

*Primary Examiner* — Sultan Chowdhury
(74) *Attorney, Agent, or Firm* — Rossi, Kimms & McDowell LLP

(57) ABSTRACT

A light source apparatus includes a first solid light source, a second solid light source configured to emit light with a wavelength different from that from the first solid light source, and a controller configured to control turning on of the first and second solid light sources. The controller turns on the second solid light source while maintaining turning on the first solid light source after turning on the first solid light source.

37 Claims, 20 Drawing Sheets

(56) References Cited

U.S. PATENT DOCUMENTS

| | | | |
|---|---|---|---|
| 2010/0302515 A1* | 12/2010 | Plut ..................... | H04N 9/3194 353/85 |
| 2013/0003368 A1* | 1/2013 | Li ......................... | G03B 33/08 362/231 |
| 2016/0025327 A1* | 1/2016 | Abe ....................... | G03B 29/00 348/744 |
| 2016/0073071 A1* | 3/2016 | Nagashima ............. | G02B 5/18 353/121 |
| 2017/0099469 A1 | 4/2017 | Matsumoto | |
| 2017/0176845 A1* | 6/2017 | Ogino ..................... | F21V 7/05 |
| 2018/0199016 A1* | 7/2018 | Shimizu ................ | H01L 23/427 |

FOREIGN PATENT DOCUMENTS

| | | |
|---|---|---|
| CN | 108287448 A | 7/2018 |
| CN | 108375867 A | 8/2018 |
| JP | 2016224304 A | 12/2016 |
| JP | 2018049205 A | 3/2018 |

* cited by examiner

LIGHT SOURCE APPARATUS AND IMAGE PROJECTION APPARATUS

BACKGROUND OF THE INVENTION

Field of the Invention

The present invention relates to a light source apparatus suitable for an image projection apparatus, such as a liquid crystal projector.

Description of the Related Art

Some image projection apparatuses (referred to as projectors hereinafter) configured to modulate light emitted from a light source with a light modulation element, such as a liquid crystal panel, and to project the light onto a projection surface use a laser diode (LD) as a light source. One of such projectors, as disclosed in Japanese Patent Laid-Open No. ("JP") 2016-224304, uses a plurality of LDs (blue LD and red LD) that emit light with different wavelengths.

Characteristically, the red LD is more likely to cause an optical damage (COD: Catastrophic Optical Damage) than the blue LD particularly when the temperature is lower. In the light source apparatus using a plurality of red LDs, a certain red LD that malfunctions does not emit the light or generate the heat even though supplied with the drive current, and the temperature of the normal red LD adjacent to the abnormal red LD lowers. As a result, the COD may occur even in the normal red LD.

SUMMARY OF THE INVENTION

The present invention provides a light source apparatus and a projector, each of which can suppress COD of a light source, such as a red LD.

A light source apparatus according to one aspect of the present invention includes a first solid light source, a second solid light source configured to emit light with a wavelength different from that from the first solid light source, and a controller configured to control turning on of the first and second solid light sources. The controller turns on the second solid light source while maintaining turning on the first solid light source after turning on the first solid light source. An image projection apparatus including the light source apparatus also constitutes another aspect of the present invention.

A light source apparatus according to another aspect of the present invention includes a first solid light source, a second solid light source arranged to transfer heat generated when the first solid light source is turned on and configured to emit light with a wavelength different from that of the first solid light source, and a controller configured to control a drive current for turning on each of the first and second solid light sources. In turning on the first and second light sources, the controller increases the drive current of the second solid light source to a set value by taking time longer than that used for the drive current of the first solid light source to increase up to the set value. An image projection apparatus including the light source apparatus also constitutes another aspect of the present invention.

A control method for a light source apparatus according to another aspect of the present invention including a first solid light source, and a second solid light source arranged to transmit heat generated when the first solid light source is turned on, and configured to emit light with a wavelength different from that of the first solid light source includes the steps of turning on the first solid light source, and turning on the second solid light source after turning on the first solid light source. A storage medium storing a program that causes a computer to execute the control method also constitute another aspect of the present invention.

A control method for a light source apparatus according to another aspect of the present invention including a first solid light source, and a second solid light source arranged to transmit heat generated when the first solid light source is turned on, and configured to emit light with a wavelength different from that of the first solid light source, the control method includes the step of controlling a drive current for turning on each of the first and second solid light sources. In turning on the first and second solid light sources, the controlling step increases the drive current of the second solid light source up to a set value by taking time longer than that used for the drive current of the first solid light source to increase up to the set value. A storage medium storing a program that causes a computer to execute the control method also constitute another aspect of the present invention.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
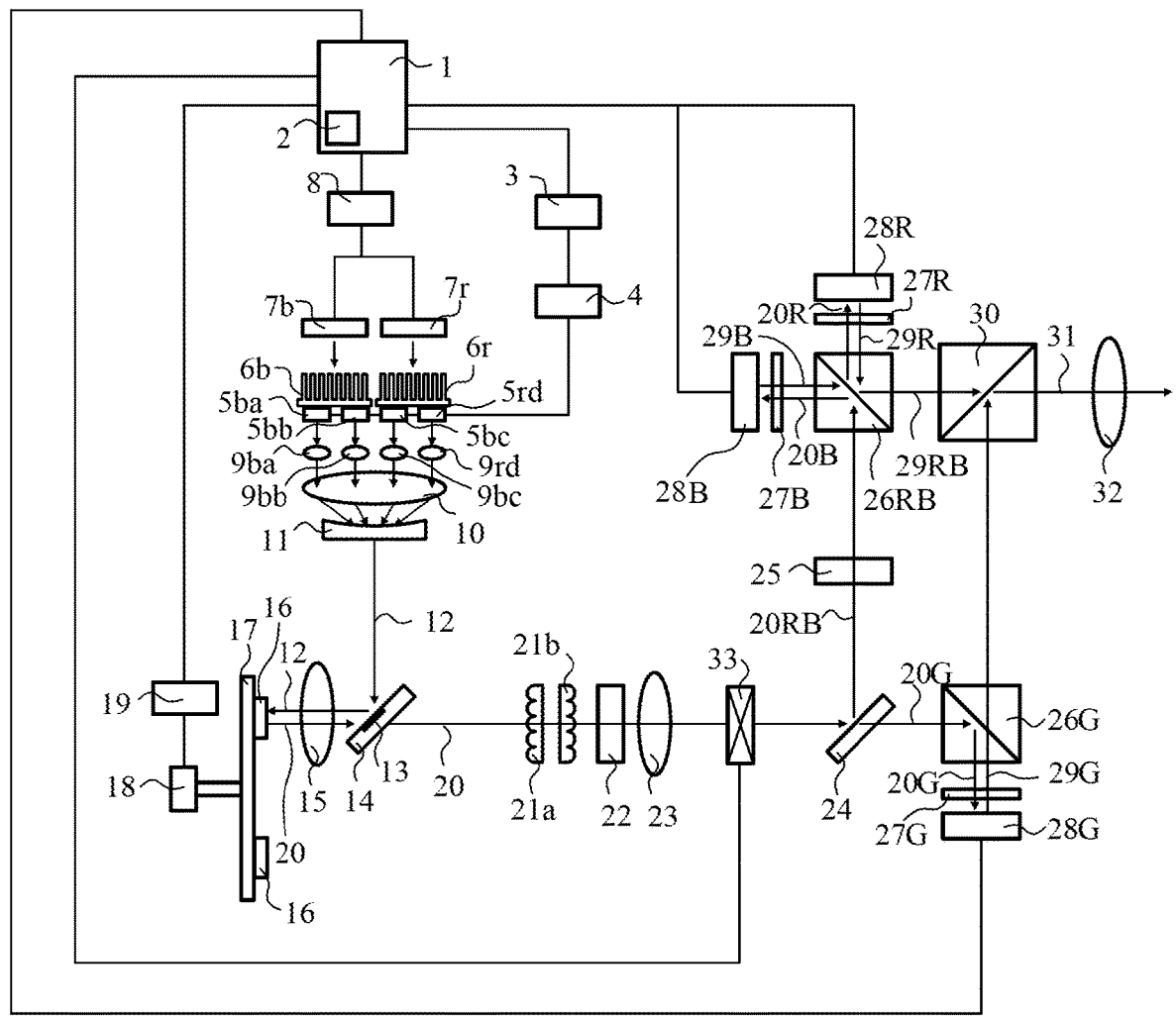
FIG. 1 illustrates a configuration of a projector according to a first embodiment of the present invention.

FIG. 1 illustrates a configuration of a projector as an image projection apparatus according to a first embodiment of the present invention. In the following description, R, G, and B respectively mean red, green, and blue. Reference numeral 1 denotes a system controller, reference numeral 2 denotes a mode switching unit, reference numeral 3 denotes a drive current calculator, and reference numeral 4 denotes a light source driver. Reference numerals 5ba, 5bb, and 5bc denote B light sources as a first light source (first solid light source), and reference numeral 5rd denotes an R light source as a second light source (second solid light source). Reference numeral 6b denotes a B light source heat sink, reference numeral 6r denotes a BR light source heat sink, reference numeral 7b denotes a B light source cooler, reference numeral 7r denotes a BR light source cooler, and reference numeral 8 denotes a cooling controller.

Reference numerals 9ba, 9bb, and 9bc denote B collimator lenses, and reference numeral 9rd denotes an R collimator lens d. Reference numeral 10 denotes a first lens, reference numeral 11 denotes a second lens, reference numeral 13 denotes a light reflecting member, reference numeral 14 denotes a glass plate, and reference numeral 15 denotes a third lens. Reference numeral 16 denotes a fluorescent body. Reference numeral 17 denotes a fluorescent body support member. Reference numeral 18 denotes a motor. Reference numeral 19 denotes a motor controller. Reference numeral 21a denotes a first fly eye lens. Reference numeral 21b denotes a second fly eye lens. Reference numeral 22 denotes a polarization conversion element. Reference numeral 23 denotes a fourth lens.

Reference numeral 24 denotes a dichroic mirror. Reference numeral 25 denotes a wavelength selective phase plate. Reference numeral 26RB denotes an RB polarization beam splitter, and reference numeral 26G denotes a G polarization beam splitter. Reference numeral 27R denotes an R quarter waveplate, reference numeral 27G denotes a G quarter waveplate, and reference numeral 27B denotes a B quarter waveplate. Reference numeral 28R denotes an R light modulator, reference numeral 28G denotes a G light modulator, and reference numeral 28B denotes a B light modulator. Reference numeral 30 denotes a color combining prism, and reference numeral 32 denotes a projection lens.

The drive current calculator 3 calculates the drive current for each of the B light sources 5ba, 5bb, and 5bc and the R light source 5rd in accordance with an instruction from the system controller 1. The light source driver 4 supplies each drive current calculated by the drive current calculator 3 to each light source to drive it. The system controller 1 and the drive current calculator 3 constitute a controller.

The B light sources 5ba, 5bb, and 5bc include the same semiconductor laser diodes (LDs) that emit B light (blue light). Each of the B light sources 5ba, 5bb, and 5bc has a peak wavelength of, for example, 455 nm. The R light source 5rd is a semiconductor LD that emits the R light (red light). The R light source 5rd has a peak wavelength of, for example, 635 nm. The B light sources 5ba and 5bb are attached to the B light source heat sink 6b. The B light source 5bc as the first solid light source and the R light source 5rd as the second solid light source are attached to the heat source 6r for BR light source as the heat conductive member. Each heat sink includes a copper plate or the like provided with a radiation fin. Each light source and each heat sink may be in close contact with a heat conductive member such as a heat conductive sheet.

Disposed on the back of the B light source heat sink 6b and the BR light source heat sink 6r are a B light source cooler (referred to as a B light source cooling fan hereinafter) 7b configured with a cooling fan and the BR light source cooler (referred to as a BR light source cooling fan hereinafter) 7r. The B light source heat sink 6b and the BR light source heat sink 6r are cooled by the cooling air from the B light source cooling fan 7b and the BR light source cooling fan 7r. A rotational speed of each of the B light source cooling fan 7b and the BR light source cooling fan 7r is controlled by the cooling controller 8 based on an instruction of the system controller 1. In FIG. 1, the arrow directions extending from the B light source cooling fan 7b and the BR light source cooling fan 7r indicate cooling air directions.

The BR light source heat sink 6r transfers the heat generated by the B light source 5bc to the R light source 5rd. The BR light source heat sink 6r averages the heat generated by each of the B light source 5bc and the R light source 5rd. The B light source 5bc and the R light source 5rd can be simultaneously cooled by cooling the BR light source heat sink 6r with the R light source cooling fan 7r.

The B light fluxes emitted from the B light sources 5ba, 5bb, and 5bc enters the B collimator lenses 9ba, 9bb, and 9bc, respectively. The R light emitted from the R light source 5rd enters the R collimator lens 9rd. Each collimator lens converts the light from each light source into substantially parallel light. The arrow direction from each light source in FIG. 1 represents the optical path and traveling direction of the light. The same applies to the subsequent optical paths.

The light emitted from each collimator lens enters the first lens 10 and the second lens 11 and is emitted as excitation light 12. The first lens 10 and the second lens 11 serve to adjust the beam diameter of the light emitted from each of the collimator lenses.

The excitation light 12 is reflected by the light reflecting member 13 provided on the surface of the glass plate 14, and enters the fluorescent body 16 through the third lens 15. The light reflecting member 13 is provided only on the portion of the surface of the glass plate 14 onto which the excitation light 12 is irradiated. The third lens 15 condenses the excitation light 12 to form a light irradiation area of a predetermined size on the fluorescent body 16.

The fluorescent body 16 is made, for example, of YAG:Ce. The fluorescent body 16 is provided in a circumferential direction around the rotation axis of the motor 18 and supported by a fluorescent body support member 17. The fluorescent body support member 17 is typically made of a metal plate such as aluminum. However, the material is not limited as long as it has the same function as the metal plate. The motor 18 rotates the fluorescent body 16 and the fluorescent body support member 17 in order to efficiently radiate the heat from the fluorescent body 16. The number of rotations of the motor 18 is controlled by the motor controller 19 in accordance with an instruction of the system controller 1.

The fluorescent body 16 converts a wavelength of part of the B light in the excitation light 12 to generate yellow fluorescent light. The fluorescence light, the excitation light (non-conversion light) of B unconverted by the fluorescent body 16, and the R light are combined to generate illumination light 20 as white (W) light.

The illumination light 20 enters a third lens 15 and is converted into substantially parallel light. The illumination light 20 transmitted through the third lens 15 transmits through the portion of the glass plate 14 other than the light reflecting member 13, the first fly eye lens 21a, and the second fly eye lens 21b, thereby is divided into a plurality of light beams, and enters the polarization conversion element 22. The polarization conversion element 22 converts the illumination light 20 as nonpolarized light into linearly polarized light having one specific polarization direction. In general, the light flux from the LD is linearly polarized light, but the illumination light 20 from the fluorescent body 16 is nonpolarized light. Thus, for an efficient polarization separation in a polarization beam splitter to be described later, the polarization conversion element 22 is provided to convert it into linearly polarized light (S-polarized light having a polarization direction perpendicular to the paper plane in FIG. 1).

The plurality of luminous fluxes as the illumination light 20 emitted from the polarization conversion element 22 are condensed by the fourth lens 23 and superimposed on the three light modulators 28R, 28G, and 28B. Thereby, each light modulation part is uniformly illuminated.

The illumination light 20 having transmitted through the fourth lens 23 travels to the shutter 33 provided on the optical path. A light amount of the illumination light 20 passing through the shutter 33 is variable in accordance with the opening and closing amount of the shutter 33. The opening and closing amount of the shutter 33 is controlled by the system controller 1. When the shutter 33 is completely closed, the illumination light 20 is almost blocked, and the projection image can be made an all-black image.

The illumination light 20 that has passed through the shutter 33 is guided to the dichroic mirror 24. The dichroic mirror 24 reflects the RB light 20RB in the illumination light 20 and transmits the G light 20G. The G light 20G as S-polarized light transmitted through the dichroic mirror 24 enters the G polarization beam splitter 26G, is reflected by its polarization splitting plane, and reaches the G light modulator 28G. The G light modulator 28G is a reflection type liquid crystal display element of a digital drive type, and forms an original image for modulating the G light 20G. The system controller 1 drives the G light modulator 28G to form the original image according to an input image signal from the outside. Then, the system controller 1 turns on and off each pixel in the G light modulator 28G within each frame period, and controls the duty of this driving to control the plurality of gradations in the G light modulators 28G. The same applies to the R light modulator 28R and the B light modulator 28B.

The G light modulator 28G modulates and reflects the G light 20G according to the original image. Thereby, the modulated light 29G is emitted from the G light modulator 28G. An S-polarized light component in the modulated light 29G is reflected by the polarization splitting plane in the G polarization beam splitter 26G, returned to the light source side, and removed from the projection light. On the other hand, a P-polarized light component in the modulated light 29G passes through the polarization splitting plane of the G polarization beam splitter 26G. Then, where all polarized light components are converted into the S-polarized light (referred to as an all-black display state hereinafter), the slow axis or the fast axis of the quarter waveplate 27G is adjusted in a direction perpendicular to a plane that contains the entrance and reflection optical axes of the G polarization beam splitter 26G. Thereby, the influence of the disturbance of the polarization state generated by the G polarization beam splitter 26G and the G light modulator 28G can be kept small. The modulated light 29G emitted from the G polarization beam splitter 26G enters the color combining prism 30.

The RB light 20RB reflected by the dichroic mirror 24 enters the wavelength selective phase plate 25. The wavelength selective phase plate 25 converts the R light into P polarized light by rotating its polarization direction by 90°, and transmits the B light as S-polarized light without rotating its polarization direction. The RB light 20RB having transmitted through the wavelength selective phase plate 25 enters the RB polarization beam splitter 26RB.

The RB polarization beam splitter 26RB transmits the R light 20R as the P-polarized light and reflects the B light 20B as the S-polarized light. The R light 20R having transmitted through the polarization splitting plane of the RB polarization beam splitter 26RB is modulated and reflected by the R light modulator 28R, and is emitted as the modulated light 29R. A P-polarized light component in the modulated light 29R transmits through the polarization splitting plane in the RB polarization beam splitter 26RB, returned to the light source side, and removed from the projection light. On the other hand, an S-polarized light component in the modulated light 29R is reflected by the polarization splitting plane in the RB polarization beam splitter 26RB and enters the color combining prism 30.

The B light 20B reflected by the polarization splitting plane of the RB polarization beam splitter 26RB is modulated and reflected by the B light modulator 28B to be modulated light 29B. An S-polarized light component in the modulated light 29B is reflected by the polarization splitting plane in the RB polarization beam splitter 26RB, returned to the light source side, and removed from the projection light. On the other hand, a P-polarized light component in the modulated light 29B transmits through the polarization splitting plane in the RB polarization beam splitter 26RB and enters the color combining prism 30. Then, the all-black display state of each of R and B can be adjusted by adjusting the slow axes of the quarter waveplates 27R and 27B in the same manner as the G quarter waveplate 27G. The RB light 29RB thus combined into one light flux and emitted from the RB polarization beam splitter 26RB enters the color combining prism 30.

The color combining prism 30 generates projection light 31 by combining the RB light 29RB and by reflecting the G light 29G. The projection light 31 is enlarged and projected onto an unillustrated projection surface, such as a screen, via the projection lens 32. Thereby, a color image as a projection image is displayed. The optical path illustrated in FIG. 1 corresponds to a case where the projector displays an all-white image. The following embodiments assume that the projector displays an all-white image unless otherwise specified.

Figure 2:
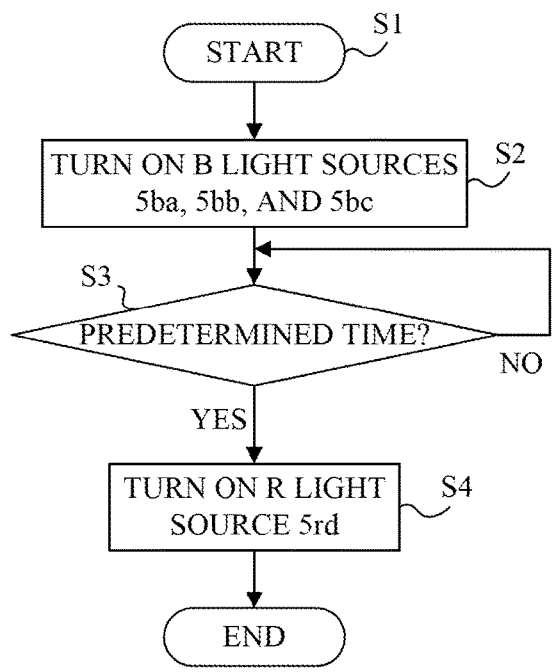
FIG. 2 is a flowchart showing light source lighting processing performed by the projector according to the first embodiment.

A flowchart in FIG. 2 illustrates light source lighting processing performed by the system controller 1 (and the drive current calculator 3) according to this embodiment. The system controller 1 executes this processing according to a computer program. In the following description, "S" stands for the step.

When the user turns on the projector by operating a power button provided on the projector or a power button provided on a remote controller, the system controller 1 starts this processing in S1.

Figure 3:
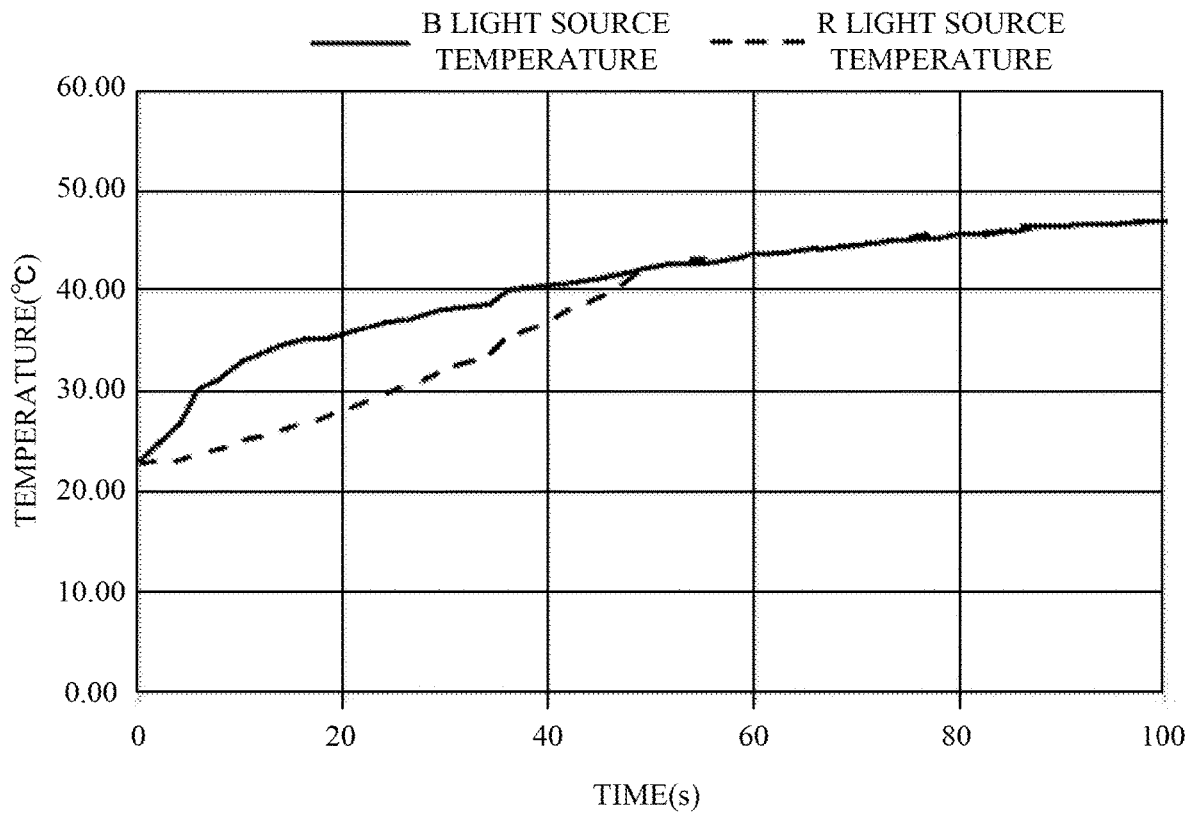
FIG. 3 illustrates a temperature change when an LD turns on in the projector according to the first embodiment.

Next, in S2, the system controller 1 supplies the drive current of the set value calculated by the drive current calculator 3 to each of the B light sources 5ba, 5bb, and 5bc via the light source driver 4 to turn on them. As a result, the heat generated from the lit B light source 5bc transmits to the BR light source heat sink 6r and reaches the R light source 5rd to raise the temperature of the R light source 5rd. FIG. 3 illustrates temperature changes of the B light source 5bc and the R light source 5rd when the power is turned on. As illustrated in FIG. 3, although the drive current is not supplied to the R light source 5rd, the heat of the B light source 5bc transmits and thus the temperature of the R light source 5rd rises.

Next, in S3, the system controller 1 as a timer measures an elapsed time after the B light sources 5ba, 5bc, and 5bc are turned on, and determines whether the predetermined time has elapsed. The predetermined time is experimentally obtained for which the temperature of the R light source 5rd reaches a temperature at which the COD is unlikely to occur in the R light source 5rd, and set based on the time. If the predetermined time has not elapsed, the system controller 1 repeats the determination in S3, and if the predetermined time has elapsed, the flow proceeds to S4.

In S4, the system controller 1 supplies the drive current of the set value calculated by the drive current calculator 3 to the R light source 5rd via the light source driver 4 to turn on it. Then, the system controller 1 ends this processing.

After the B light sources 5ba, 5bc, and 5bc are turned on when the projector is powered on, this embodiment turns on the R light source 5rd when the temperature of the R light source 5rd rises to a temperature at which the COD is unlikely to occur. Thus, the COD can be restrained in the R light source 5rd.

This embodiment describes the B light source 5bc and the R light source 5rd arranged on the same BR light source heat sink 6r, but may transmit the heat of the B light source using a heat conductive member such as a heat pipe other than the heat sink.

A heater may be provided to heat the R light source 5rd and contact at least one of the R light source 5rd and the BR light source heat sink 6r.

Second Embodiment

Figure 4:
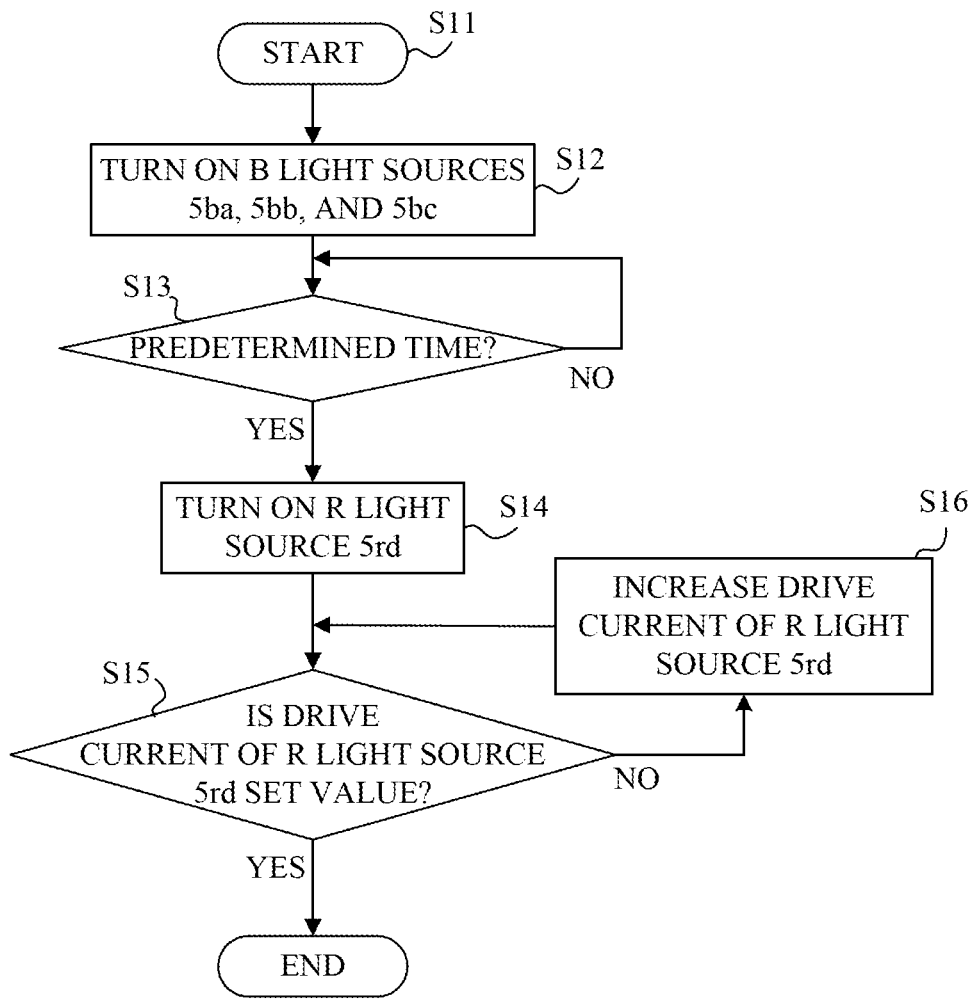
FIG. 4 is a flowchart showing light source lighting processing performed by the projector according to a second embodiment of the present invention.

Next follows a description of a second embodiment according to the present invention. A configuration of a projector according to the second embodiment is the same as that of the projector in the first embodiment. A flowchart in FIG. 4 illustrates light source lighting processing performed by the system controller 1 according to this embodiment.

When the user turns on the projector by operating the power button provided on the projector or the power button provided on the remote controller, the system controller 1 starts this processing in S11.

Next, in S12, the system controller 1 supplies the drive current of the set value calculated by the drive current calculator 3 to the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S13, the system controller 1 determines whether or not a predetermined time has elapsed after the B light sources 5ba, 5bc, and 5bc are turned on. The predetermined time is the same as that in the first embodiment. If the predetermined time has not elapsed, the system controller 1 repeats the determination in S13. If the predetermined time has elapsed, the flow proceeds to S14.

In S14, the system controller 1 supplies the drive current calculated by the drive current calculator 3 to the R light source 5rd via the light source driver 4 to turn on it. Then, the system controller 1 gradually increases the drive current supplied to the R light source 5rd in a stepwise manner via the drive current calculator 3. In other words, the drive current supplied to the R light source 5rd is increased to the set value by taking time longer than that necessary to supply the drive current of the set value to the B light sources 5ba, 5bb, and 5bc in S12.

Figure 5A:
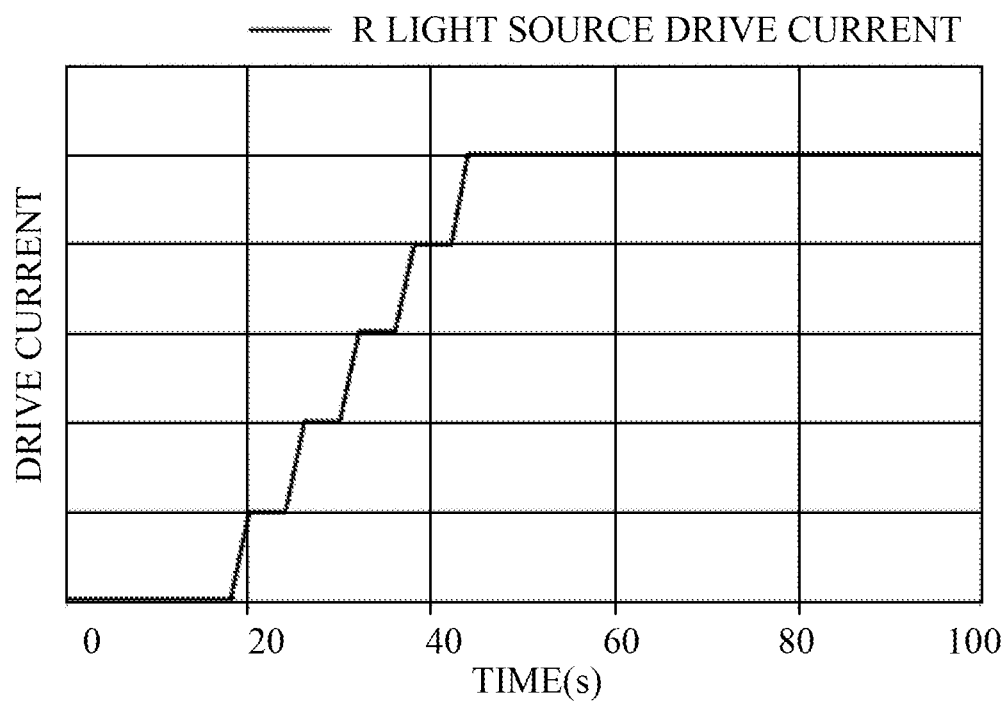
FIGS. 5A and 5B illustrate a drive current and a temperature change of the red LD when the LD turns on in the projector according to the second embodiment. FIGS.
Figure 5B:
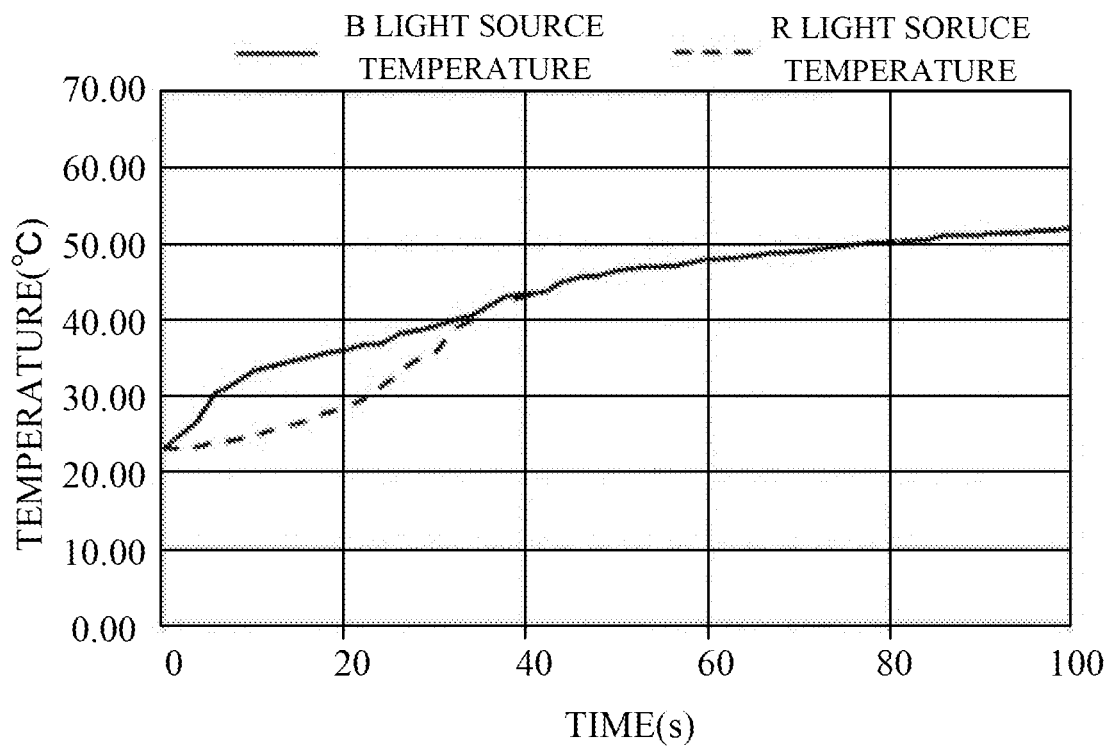

This is because the temperature of the R light source 5rd is rising due to the heat from the B light source 5bc as described in the first embodiment, but the temperature of the R light source 5rd has not risen to the temperature that can restrain the COD due to the light emission at a high drive current. Hence, as illustrated in FIG. 5A, the system controller 1 sets to be low the drive current supplied to the R light source 5rd at first to promote the temperature rise due to the heat generation associated with the light emission of the R light source 5rd itself. The drive current is increased at least once to finally reach the set value. Thereby, the COD can be suppressed in the R light source 5rd. FIG. 5B illustrates the temperature change of the R light source 5rd at this time.

After the supply of the drive current to the R light source 5rd is started in S14, the system controller 1 determines whether the drive current of the R light source 5rd calculated by the drive current calculator 3 has reached the set value in S15. If not, the drive current calculator 3 increases the drive current of the R light source 5rd by a predetermined amount in S16. When the drive current of the R light source 5rd reaches the set value by increasing the drive current in S16 at least once, the system controller 1 ends this processing.

After the B light sources 5ba, 5bc, and 5bc are turned on when the projector is turned on, this embodiment turns on the R light source 5rd when the temperature of the R light source 5rd rises to a temperature at which the COD is unlikely to occur. Hence, the COD can be suppressed in the R light source 5rd.

This embodiment increases the drive current supplied to the R light source 5rd stepwise, but may continuously and gradually increase it up to the set value. The COD can be more reliably suppressed or the drive current of the R light source 5rd can more quickly reach the set value by changing the increase rate of the drive current supplied to the R light source 5rd according to the temperature and use time of the R light source 5rd.

Third Embodiment

Figure 6:
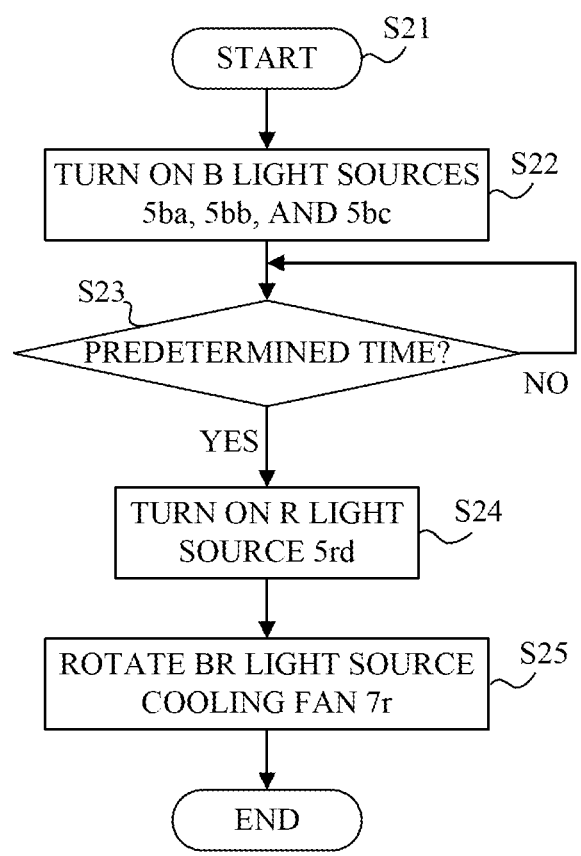
FIG. 6 is a flowchart showing light source lighting processing performed by a projector according to a third embodiment of the present invention.

Next follows a description of a third embodiment according to the present invention. A configuration of the projector according to the third embodiment is the same as that of the projector in the first embodiment. A flowchart of FIG. 6 illustrates light source lighting processing performed by the system controller 1 according to this embodiment.

When the user turns on the projector by operating the power button provided on the projector or the power button provided on the remote controller, the system controller 1 starts this processing in S21.

Next, in S22, the system controller 1 supplies the drive current of the set value calculated by the drive current calculator 3 to the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S23, after turning on the B light sources 5ba, 5bc, and 5bc, the system controller 1 determines whether a predetermined time has elapsed. The predetermined time is the same as that in the first embodiment. If the predetermined time has not yet elapsed, the system controller 1 repeats the determination in S23. If the predetermined time has elapsed, the flow proceeds to S24.

In S24, the system controller 1 supplies the drive current of the set value calculated by the drive current calculator 3 to the R light source 5rd via the light source driver 4 to turn on it.

Next, in S25, the system controller 1 rotates the BR light source cooling fan 7r to cool the BR light source heat sink 6r. In other words, by stopping the rotation of the BR light source cooling fan 7r until the R light source 5rd is turned on, the temperature rise of the R light source 5rd is accelerated, and consequently the time to turn on the R light source 5rd is shortened. Thereafter, the system controller 1 ends this processing.

After the B light sources 5ba, 5bc, and 5bc are turned on when the projector is turned on, this embodiment turns on the R light source 5rd when the temperature of the R light source 5rd rises to a temperature at which the COD is unlikely to occur. Hence, the COD can be suppressed in the R light source 5rd.

This embodiment describes starting rotating the BR light source cooling fan 7r is waited until the R light source 5rd is turned on, but may start rotating the BR light source cooling fan 7r even before the R light source 5rd is turned on, as long as the temperature of the R light source 5rd has sufficiently risen.

The R light source 5rd may be turned on when the temperature of the R light source 5rd detected by the temperature sensor reaches the predetermined temperature that can suppress the CCD as in the fourth embodiment described later, rather than turning on the R light source 5rd in S24 after the predetermined time elapses in S23. The R light source 5rd may be turned on when the light emission amount of the R light source 5rd detected by the light amount sensor reaches the light amount corresponding to the predetermined temperature. The R light source 5rd may be turned on when the drive voltage of the R light source 5rd detected by the voltage sensor reaches a voltage corresponding to the predetermined temperature. The detection target of the light emission amount and the drive voltage may be set to the B light source 5bc disposed close to the R light source 5rd. The same applies to the first and second embodiments described above.

The B light source cooling fan 7b for cooling the B light sources 5ba and 5bb may be rotated before the B light sources 5ba and 5bb are turned on or the BR light source cooling fan 7r starts rotating.

Fourth Embodiment

Figure 7:
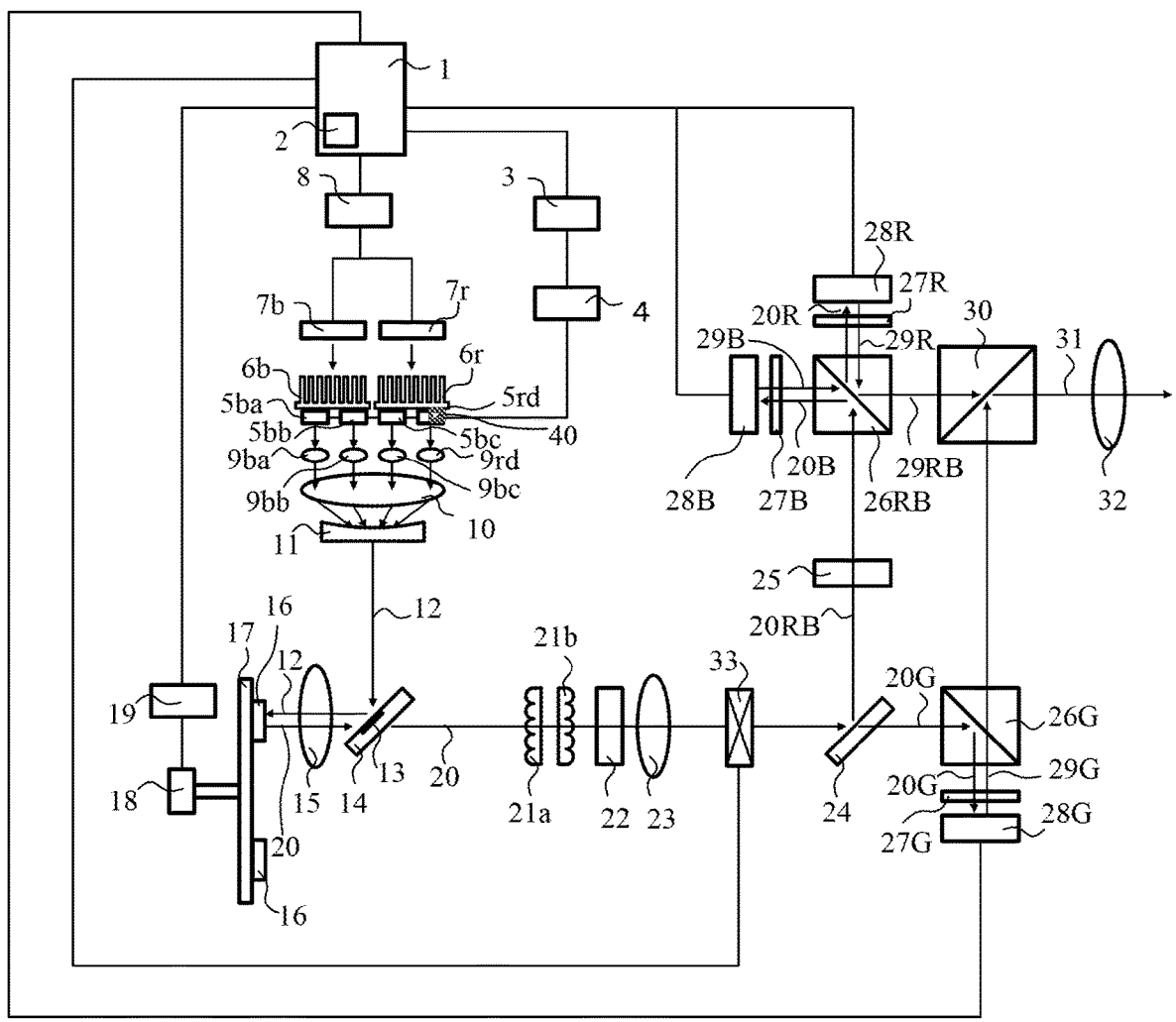
FIG. 7 illustrates a configuration of a projector according to a fourth embodiment of the present invention.
Figure 8:
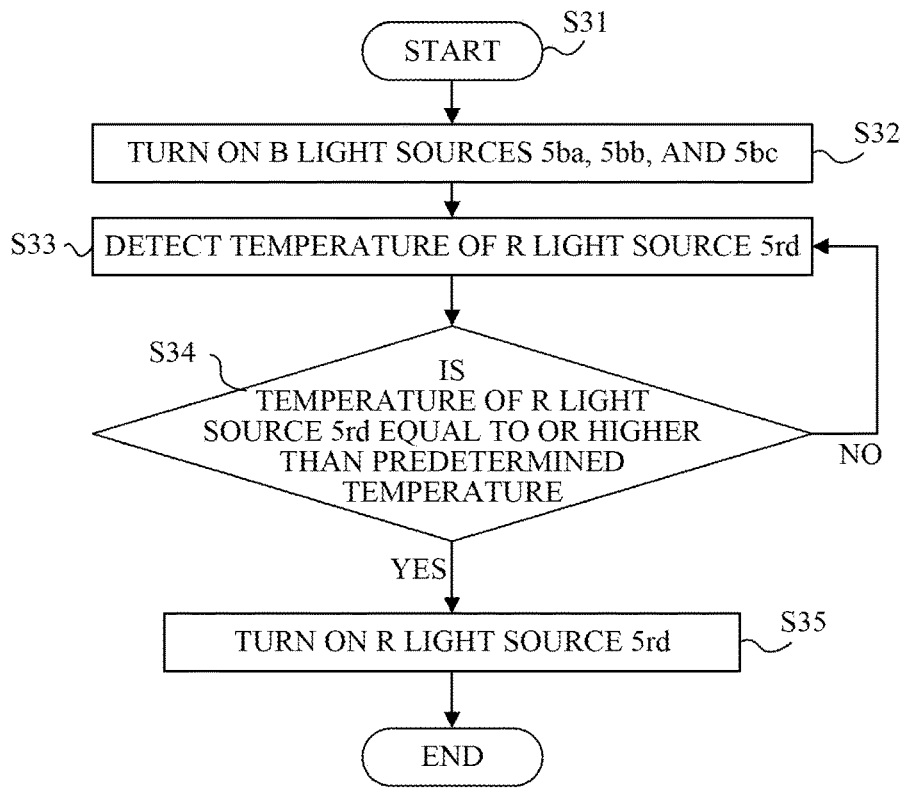
FIG. 8 is a flowchart showing light source lighting processing performed by the projector according to the fourth embodiment.

Next follows a description of a fourth embodiment according to the present invention. FIG. 7 illustrates a configuration of the projector according to the fourth embodiment. In addition to the configuration of the projector (FIG. 1) of the first embodiment, the projector according to this embodiment further includes a temperature sensor (temperature detector) 40 configured to detect the temperature of the light source 5rd. A flowchart of FIG. 8 illustrates the light source lighting processing performed by the system controller 1 according to this embodiment.

When the user turns on the projector by operating the power button provided on the projector or the power button provided on the remote controller, the system controller 1 starts this processing in S31.

Next, in S32, the system controller 1 supplies the drive current of the set value calculated by the drive current calculator 3 to the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S33, the system controller 1 detects the temperature of the R light source 5rd by the temperature sensor 40. In S34, the system controller 1 determines whether the detected temperature is equal to or higher than a predetermined temperature. The predetermined temperature is a temperature that can suppress the COD in the R light source 5rd. When the temperature of the R light source 5rd is lower than a predetermined temperature, the system controller 1 repeats the determination in S34, and when the temperature of the R light source 5rd is equal to or higher than the predetermined temperature, the system controller 1 proceeds to S35.

In S35, the system controller 1 supplies the drive current of the set value calculated by the drive current calculator 3 to the R light source 5rd via the light source driver 4 so as to turn on it. Then, this processing ends.

After the B light sources 5ba, 5bc, and 5bc are turned on when the projector is turned on, this embodiment turns on the R light source 5rd when the temperature of the R light source 5rd rises to a temperature at which the COD is unlikely to occur. Therefore, the COD can be suppressed in the R light source 5rd.

This embodiment discusses the R light source 5rd turned on when the temperature of the R light source 5rd detected by the temperature sensor 40 becomes equal to or higher than a predetermined temperature. However, this embodiment may detect the temperature of a component close to the R light source 5rd, such as the temperature of the B light source 5bc or the temperature of the BR light source heat source 6r, and may turn on the R light source 5rd when the temperature exceeds a predetermined temperature.

Fifth Embodiment

Figure 9:
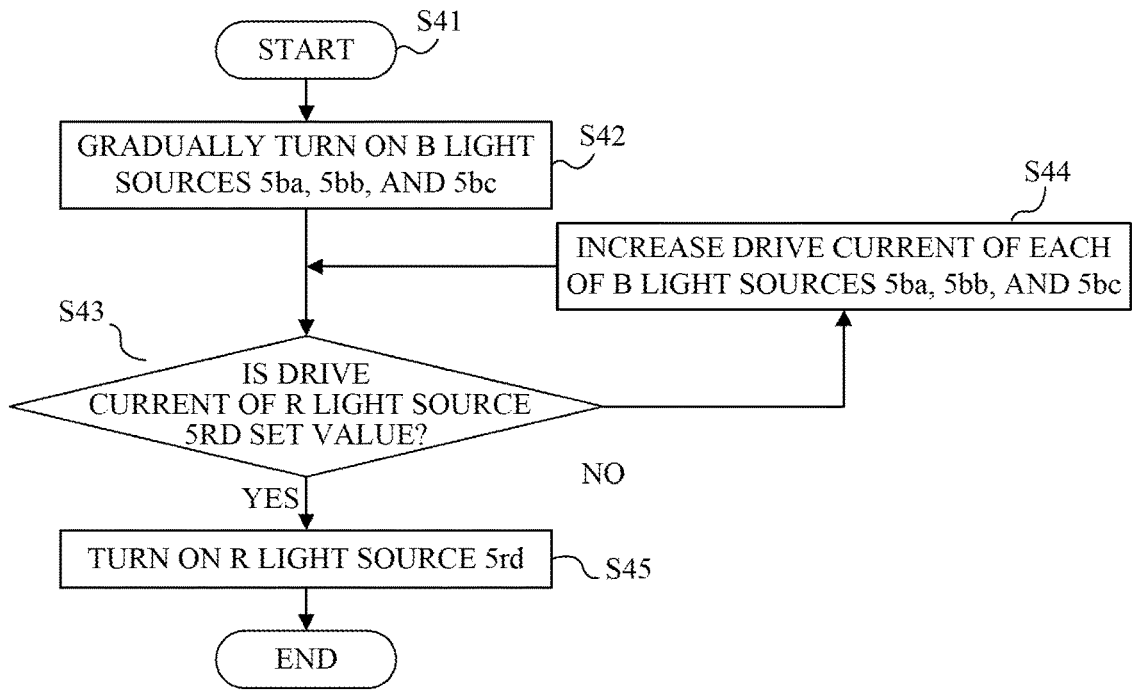
FIG. 9 is a flowchart showing light source lighting processing performed by a projector according to a fifth embodiment of the present invention.

Next follows a description of a fifth embodiment according to the present invention. The configuration of the projector according to the fifth embodiment is the same as that of the projector of the first embodiment. A flowchart in FIG. 9 illustrates light source lighting processing performed by the system controller 1 according to this embodiment.

When the user turns on the projector by operating the power button provided on the projector or the power button provided on the remote controller, the system controller 1 starts this processing in S41.

Next, in S42, the system controller 1 supplies the drive current of the set value calculated by the drive current calculator 3 to the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

However, according to this embodiment, the system controller 1 gradually or continuously increases the drive current supplied to the B light sources 5ba, 5bb, and 5bc to the set value via the drive current calculator 3. In other words, the drive current supplied to each of the light sources 5ba, 5bb, and 5bcc is increased to the set value by taking time longer than that required for the drive current of the subsequent R light source 5rd B to reach the set value. This is because the B light source is less likely to generate the COD than the R light source, but like the R light source, the COD may be generated at the low temperature. Thus, the system controller 1 sets the drive current supplied to each of the B light sources 5ba, 5bb, and 5bc to a low level at first, and promotes the temperature rise by the heat generation associated with the light emissions of the B light sources 5ba, 5bb, and 5bc itself. Thereafter, the drive current is increased at least once to finally reach the set value.

After starting supplying the drive current to each of the B light sources 5ba, 5bb, and 5bc in S42, the system controller 1 determines whether the drive current of the B light sources 5ba, 5bb, and 5bc has reached the set value in S43. If the drive current has not reached the set value, the system controller 1 causes the drive current calculator 3 to increase the drive current of each of the B light sources 5ba, 5bb, and 5bc by a predetermined amount in S44. When the drive current of each of the B light sources 5ba, 5bb, and 5bc reaches the set value by increasing the drive current in S44 at least once, the system controller 1 proceeds to S45.

In S45, the system controller 1 supplies the drive current of the set value calculated by the drive current calculator 3 to the R light source 5rd via the light source driver 4 to turn on it. Then, the system controller 1 ends this processing.

After the B light sources 5ba, 5bc, and 5bc are turned on when the projector is turned on, this embodiment turns on the R light source 5rd when the temperature of the R light source 5rd rises to a temperature at which the COD is unlikely to occur. Therefore, the COD can be restrained in the R light source 5rd.

An increase rate of the drive current supplied to each of the B light sources 5ba, 5bc, and 5bc may be changed according to the temperature and the use time of each of the B light sources 5ba, 5bc, and 5bc. Thereby, the COD can be more reliably suppressed in the B light sources 5ba, 5bc, and 5bc, or the time required to increase the drive current of each of the B light sources 5ba, 5bc, and 5bc to the set value can be accelerated.

Sixth Embodiment

Figure 10:
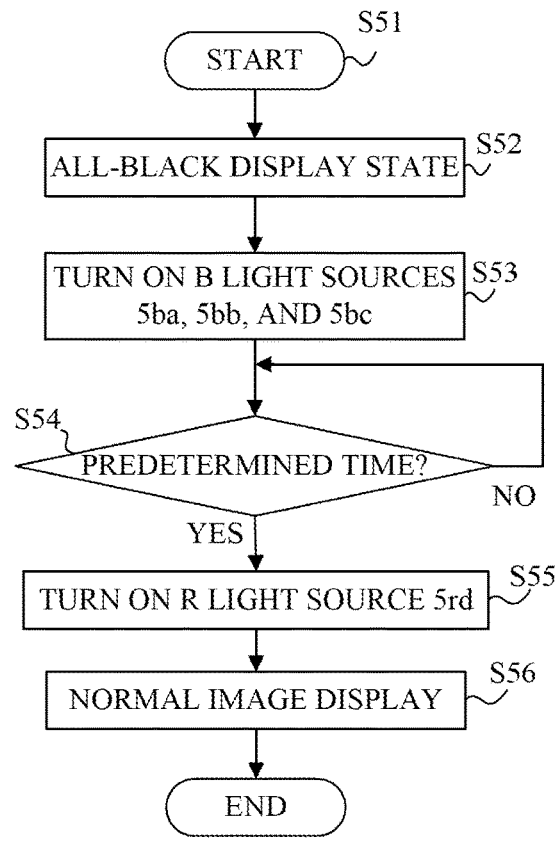
FIG. 10 is a flowchart showing light source lighting processing performed by a projector according to a sixth embodiment of the present invention.

Next follows a description of a sixth embodiment according to the present invention. A configuration of the projector according to the sixth embodiment is the same as that of the projector in the first embodiment. A flowchart of FIG. 10 illustrates light source lighting processing performed by the system controller 1 according to this embodiment.

When the user turns on the power of the projector by operating the power button provided on the projector or the power button provided on the remote controller, the system controller 1 starts this processing in S51.

Next, in S52, the system controller 1 controls the light modulators 28R, 28G, and 28B to be in the all-black display states regardless of the input image signal. This is because the B light sources 5ba, 5bc, and 5bc are turned on without turning on the R light source 5rd when the power is turned on, so an appropriately colored image cannot be projected from the projector, and this image projection is undesirable.

Next, in S53, the system controller 1 supplies the drive current of the set value calculated by the drive current calculator 3 to each of the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S54, after turning on the B light sources 5ba, 5bc, and 5bc, the system controller 1 determines whether a predetermined time has elapsed as in S3 in the first embodiment. If the predetermined time has not elapsed, the system controller 1 repeats the determination in S54. If the predetermined time has elapsed, the flow proceeds to S55.

In S55, the system controller 1 supplies the drive current of the set value calculated by the drive current calculator 3 to the R light source 5rd via the light source driver 4 to turn on it.

Next, in S55, the system controller 1 controls the light modulators 28R, 28G, and 28B to project a normal image according to the input image signal. Then, the system controller 1 ends this processing.

After the B light sources 5ba, 5bc, and 5bc are turned on when the projector is turned on, this embodiment turns on the R light source 5rd when the temperature of the R light source 5rd rises to a temperature at which the COD is unlikely to occur. Therefore, the COD can be restrained in the R light source 5rd. An improperly colored image can be prevented from being projected by controlling the light modulation sections 28R, 28G, and 28B to be in the all-black display states until all the light sources are turned on.

The temperature sensor described in the fourth embodiment may be provided, and when the temperature of the R light source 5rd (or another component close to the R light source 5rd) detected by the temperature sensor in S54 is a predetermined temperature or higher, the R light source 5rd may be turned on in S55.

This embodiment describes the light modulators 28R, 28G, and 28B controlled to be in the all-black display states, but may control closing the shutter 33 to provide the all-black display states. If the shutter 33 is controlled to be opened in turning on the R light source 5rd, a normal image can be projected.

Seventh Embodiment

Figure 11:
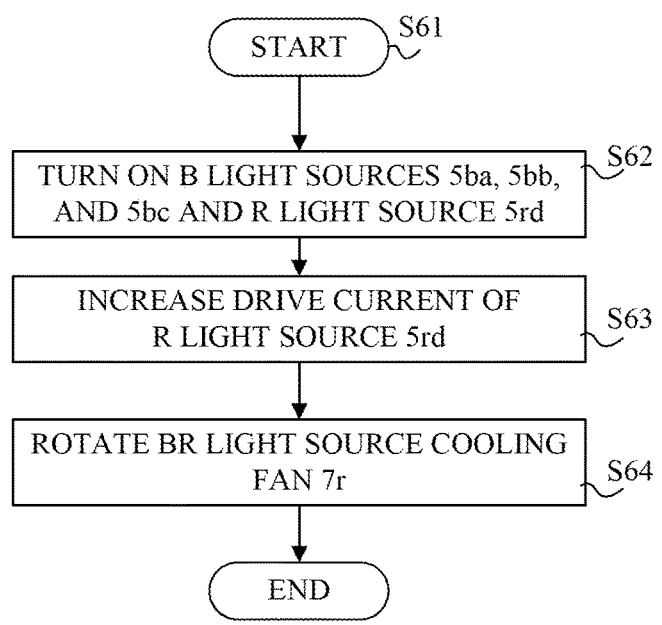
FIG. 11 is a flowchart showing light source lighting processing performed by a projector according to a seventh embodiment of the present invention.

Next follows a description of a seventh embodiment according to the present invention. A configuration of the projector according to the seventh embodiment is the same as that of the projector in the first embodiment. A flowchart of FIG. 11 illustrates light source lighting processing performed by the system controller 1 according to this embodiment.

When the user turns on the projector by operating the power button provided on the projector or the power button provided on the remote controller, the system controller 1 starts this processing in S61.

Next, in S62 and S63, the system controller 1 supplies the drive current of the set value calculated by the drive current calculator 3 to each of the B light sources 5ba, 5bb, and 5bc via the light source driver 4 to turn on them. While the system controller 1 supplies the drive current of the set value to the B light sources 5ba, 5bc, and 5bc via the drive current calculator 3, the drive current of the R light source 5rd is increased up to the set value gradually and continuously. In other words, the system controller 1 sets to be low the drive current to be supplied to the R light source 5rd c at first to accelerate the temperature rise by the heat generation associated with the light emission of the R light source 5rd itself, and thereafter increases the drive current at least once to finally reach the set value.

Next, in S64, the system controller 1 rotates the BR light source cooling fan 7r to cool the BR light source heat sink 6r. Then, the system controller 1 ends this processing.

After the B light sources 5ba, 5bc, and 5bc are turned on when the projector is turned on, this embodiment turns on the R light source 5rd when the temperature of the R light source 5rd rises to a temperature at which the COD is unlikely to occur. Hence, the COD can be suppressed in the R light source 5rd.

Each of the above embodiments describes the light source lighting processing when the projector is powered on, but the light source lighting processing similar to that of each embodiment can suppress the COD when the light source is again turned on from the mode (standby mode etc.) that temporarily turns off the light source.

Eighth Embodiment

Figure 12:
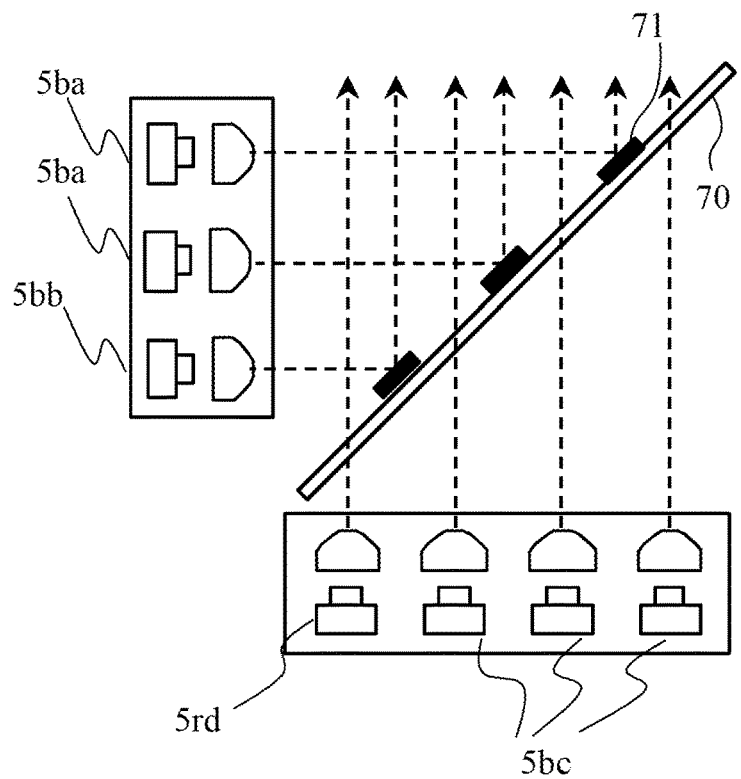
FIG. 12 illustrates a light source apparatus according to an eighth embodiment of the present invention.

The arrangement among the B light sources 5ba, 5bb, 5bc and the R light source 5rd is not limited to that in which all of the B light sources 5ba, 5bb, and 5bc and the R light source 5rd face the same direction as illustrated in FIGS. 1 and 7, and they may be orthogonally arranged as illustrated in FIG. 12. More specifically, the light fluxes from the B light sources 5ba and 5bb are reflected by a reflector 71 provided on the glass plate 70, and the light fluxes from the B light sources 5bc and R light source 5rd transmit a portion of the glass plate 70 other than the reflector 71, and may be combined with the light fluxes from the B light sources 5ba and 5bb.

If the R light source 5rd is placed between the B light sources 5bb and 5bc, the temperature of the R light source 5rd is more likely to rise due to the heat from the B light sources 5bb and 5bc. Thereby, the COD can be suppressed in the R light source 5rd.

Each of the embodiments described above uses the semiconductor laser that emits the B light and the semiconductor laser that emits the R light, but may combine a semiconductor laser that emits the G light.

Each of the above embodiments describes the rotating fluorescent substance 16, but the fluorescent body may not rotate. The fluorescent body may be of a transmission type instead of the reflection type unlike each embodiment.

Each of the above embodiments describes use of the reflection type liquid crystal display element of the digital drive type for the light modulator, but may use a reflection liquid crystal display element an analog drive type or a transmission type liquid crystal display element. Alternatively, a digital micromirror device may be used.

Ninth Embodiment

Figure 13:
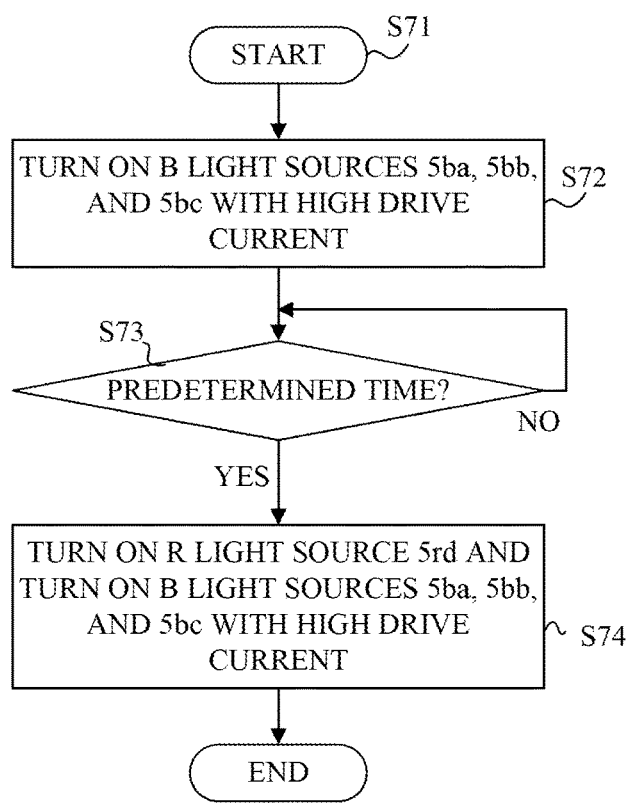
FIG. 13 is a flowchart showing light source lighting processing performed by a projector according to a ninth embodiment of the present invention.

Next follows a description of a ninth embodiment according to the present invention. A configuration of the projector according to the ninth embodiment is the same as that of the projector in the first embodiment. A flowchart of FIG. 13 illustrates light source lighting processing performed by the system controller 1 according to this embodiment.

When the user turns on the projector by operating the power button provided on the projector or the power button provided on the remote controller, the system controller 1 starts this processing in S71.

Next, in S72, the system controller 1 supplies the drive current calculated by the drive current calculator 3 to the B light sources 5ba, 5bb, and 5bc via the light source driver 4 to turn on them. Then, the system controller 1 makes the drive current supplied to the B light sources 5ba, 5bb, and 5bc via the drive current calculator 3 higher than the set value.

Next, in S73, the system controller 1 as the timer measures an elapsed time after the B light sources 5ba, 5bc, and 5bc are turned on, and determines whether a predetermined time has elapsed. The predetermined time is experimentally obtained for which the temperature of the R light source 5rd reaches a temperature at which the COD is unlikely to occur in the R light source 5rd, and set based on the time. If the predetermined time has not elapsed, the system controller 1 repeats the determination in S73. If the predetermined time has elapsed, the flow proceeds to S74.

In S74, the system controller 1 supplies the drive current of the set value calculated by the drive current calculator 3 to each of the B light sources 5ba, 5bb, and 5bc via the light source driver 4. The drive current of the set value calculated by the drive current calculator 3 is supplied to the R light source 5rd via the light source driver 4 to turn on it. Then, the flow ends.

According to this embodiment, the heat amount is high which is generated when the B light sources 5ba, 5bc, and 5bc are turned on and the projector is turned on, and the temperatures of the B light sources 5ba, 5bc, and 5bc more quickly rise. Since the heat transmits to the R light source 5rd, the temperature can quickly rise to a temperature at which COD does not easily occur, and the R light source 5rd can be turned on earlier. Thus, the CDD can be suppressed in the R light source 5rd.

Tenth Embodiment

Figure 14:
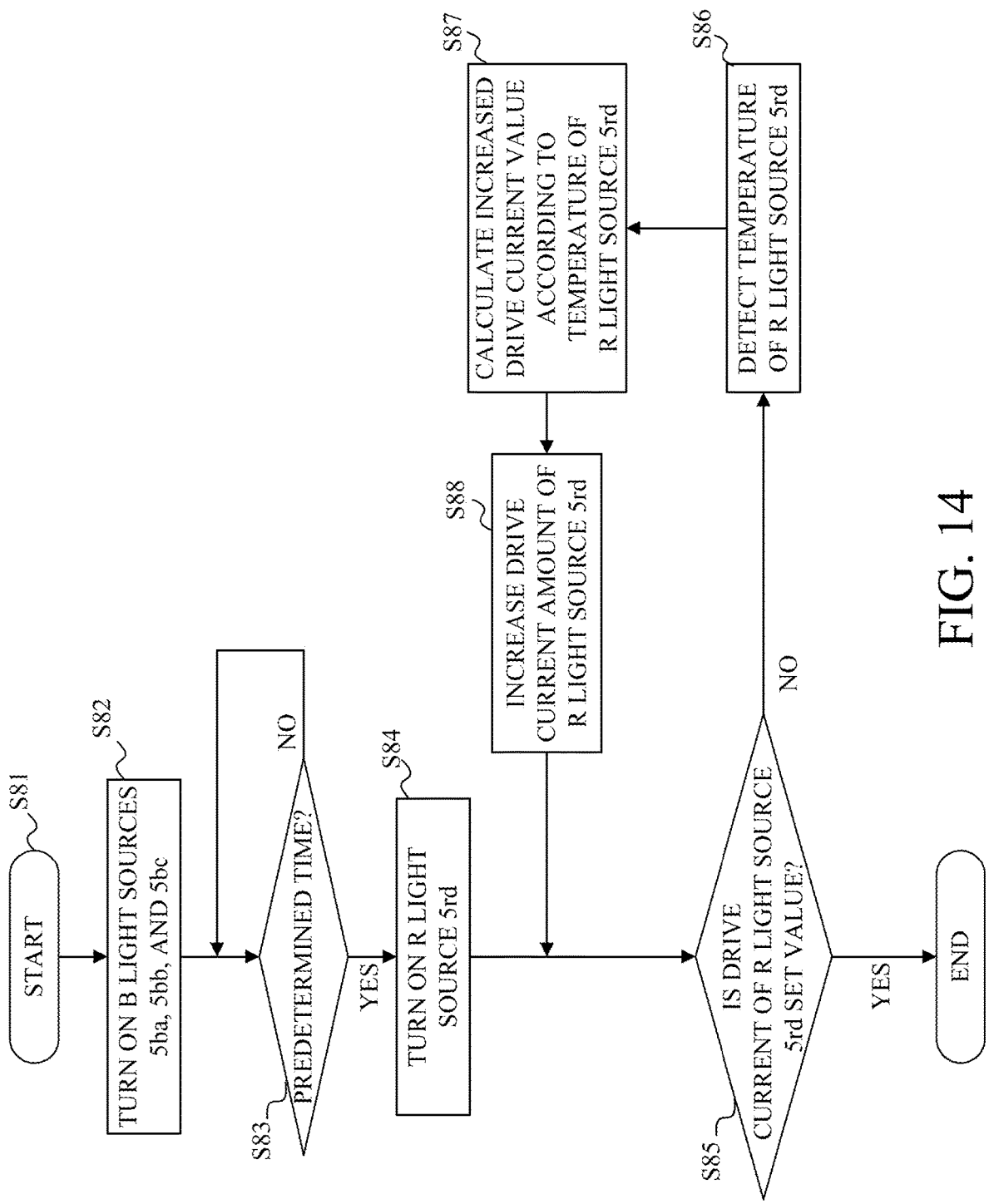
FIG. 14 is a flowchart showing light source lighting processing performed by a projector according to a tenth embodiment of the present invention.

Next follows a description of a tenth embodiment according to the present invention. A configuration of the projector according to the tenth embodiment is the same as that of the projector in the first embodiment. A flowchart of FIG. 14 illustrates light source lighting processing performed by the system controller 1 according to this embodiment.

When the user turns on the projector by operating the power button provided on the projector or the power button provided on the remote controller, the system controller 1 starts this processing in S81.

Next, in S82, the system controller 1 supplies the drive current of the set value calculated by the drive current calculator 3 to each of the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S83, the system controller 1 determines whether or not a predetermined time has elapsed after the B light sources 5ba, 5bc, and 5bc are turned on. The predetermined time is the same as that in the first embodiment. If the predetermined time has not elapsed, the system controller 1 repeats the determination in S93, and if the predetermined time has elapsed, the flow proceeds to S84.

In S84, the system controller 1 supplies the drive current calculated by the drive current calculator 3 to the R light source 5rd through the light source driver 4 to turn on it. Then, the system controller 1 gradually increases the drive current supplied to the R light source 5rd in a stepwise manner via the drive current calculator 3. In other words, the drive current supplied to the R light source 5rd is increased to the set value by taking time longer than that necessary to supply the drive current of the set value to each of the B light source 5ba, 5bb, and 5bc in S82.

In S85, it is confirmed whether the drive current of the R light source 5rd has reached the set value, and if not, the temperature of the R light source 5rd is detected in S86. In S87, an increase amount of the drive current is determined according to the temperature of the R light source 5rd.

Figure 15A:
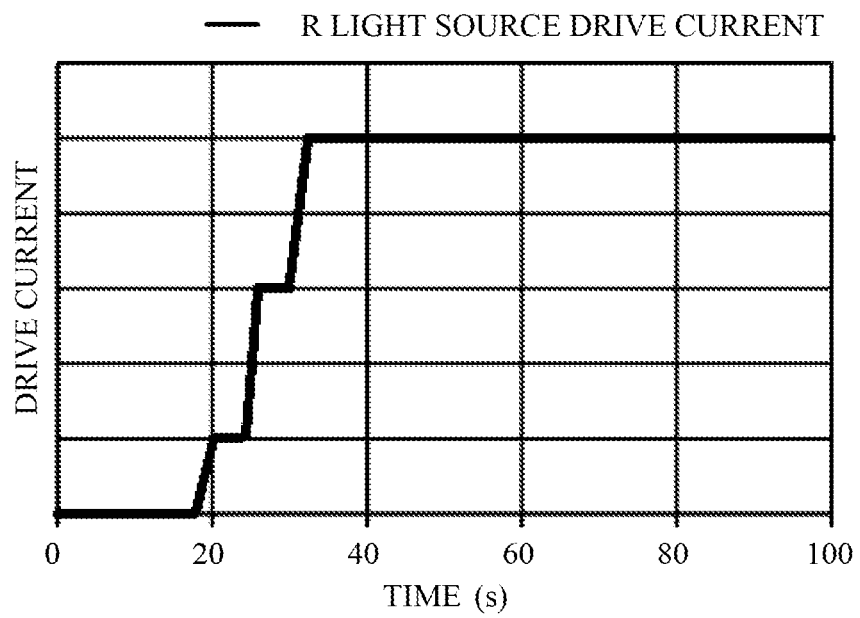
FIGS. 15A and 15B illustrate a relationship between drive current and time according to the tenth embodiment of the present invention.
Figure 15B:
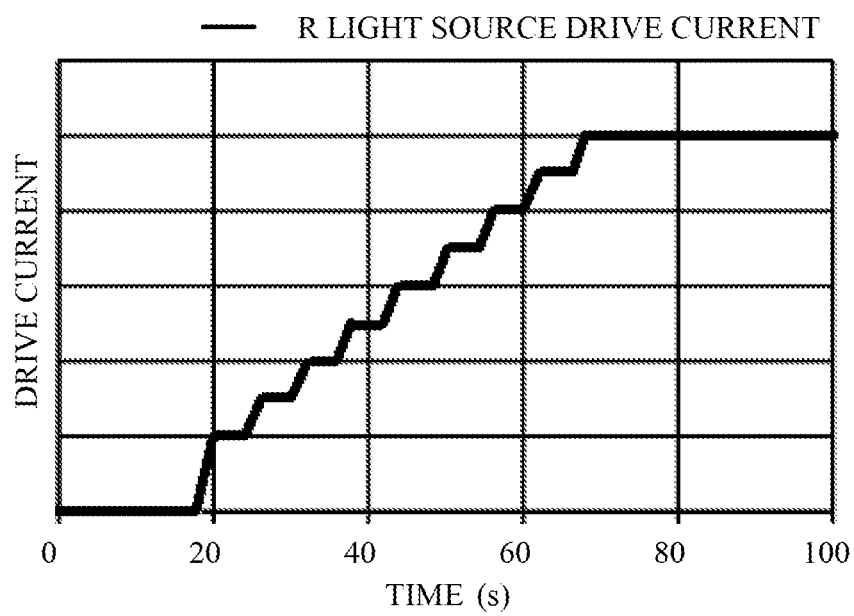

If the temperature of the R light source 5rd is high, the increase amount of the drive current is made larger, and if the temperature of the R light source 5rd is low, the increase amount of the drive current is made smaller. This is because while the temperature of the R light source 5rd is low, high drive current is likely to generate the COD caused by the light emission, thus the increase amount of the drive current is reduced, and the light emission amount is gradually increased so as to prevent the high drive current from flowing until the temperature of the R light source 5rd rises (FIG. 15A). On the other hand, when the temperature of the R light source 5rd is high, the COD caused by the light emission is unlikely to occur even if a high drive current is supplied and thus the increase amount of the drive current is made larger so that the drive current reaches the set drive current value as soon as possible (FIG. 15B).

In S88, the drive current of the R light source 5rd is increased by the amount calculated in S87. As a result, when the drive current of the R light source 5rd reaches the set value in S85, the system controller 1 ends this processing.

This embodiment changes the drive current supplied to the R light source 5rd according to the temperature of the R light source 5rd to more reliably suppress the COD or to quickly increase the drive current of the R light source 5rd to the set value.

Eleventh Embodiment

Figure 16:
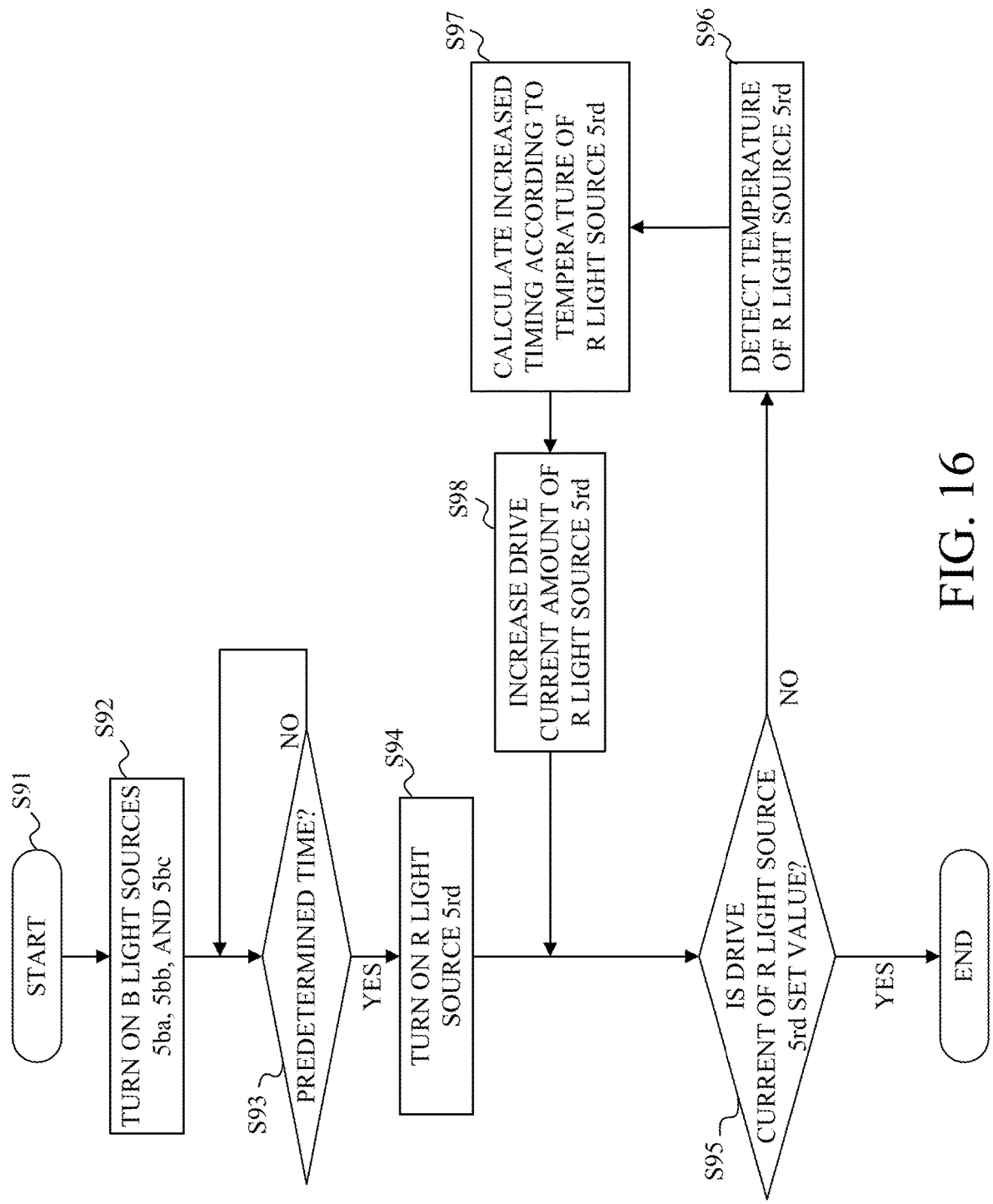
FIG. 16 is a flowchart showing light source lighting processing performed by a projector according to an eleventh embodiment of the present invention.

Next follows a description of an eleventh embodiment according to the present invention. A configuration of the projector according to the eleventh embodiment is the same as that of the projector in the first embodiment. A flowchart of FIG. 16 illustrates light source lighting processing performed by the system controller 1 according to this embodiment.

When the user turns on the projector by operating the power button provided on the projector or the power button provided on the remote controller, the system controller 1 starts this processing in S91.

Next, in S92, the system controller 1 supplies the drive current of the set value calculated by the drive current calculator 3 to the B light sources 5ba, 5bb, and 5bc via the light source driver 4 so as to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S93, the system controller 1 determines whether or not a predetermined time has elapsed after the B light sources 5ba, 5bc, and 5bc are turned on. The predetermined time is the same as that in the first embodiment. If the predetermined time has not elapsed, the system controller 1 repeats the determination in S93, and if the predetermined time has elapsed, the flow proceeds to S94.

In S94, the system controller 1 supplies the drive current calculated by the drive current calculator 3 to the R light source 5rd via the light source driver 4 to turn on it. Then, the system controller 1 gradually increases the drive current supplied to the R light source 5rd in a stepwise manner via the drive current calculator 3. In other words, the drive current supplied to the R light source 5rd is increased up to the set value by taking time longer than that necessary to supply the drive current of the set value to the B light sources 5ba, 5bb, and 5bc in S92.

The system controller determines in S95 whether the drive current of the R light source 5rd has reached the set value, and if not, detects the temperature of the R light source 5rd in S96. In S97, the system controller 1 determines the time to increase the drive current according to the temperature of the R light source 5rd.

Figure 17A:
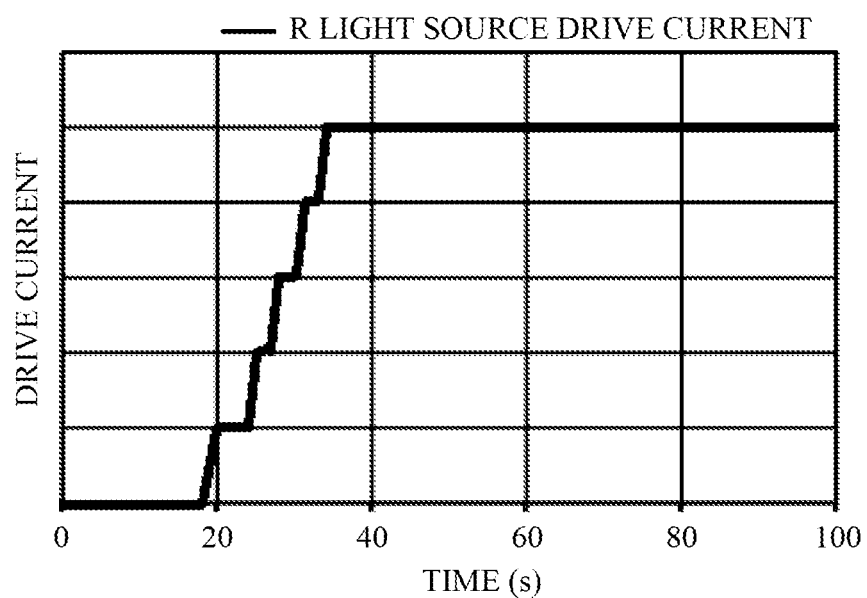
FIGS. 17A and 17B illustrate a relationship between drive current and time according to the eleventh embodiment of the present invention.
Figure 17B:
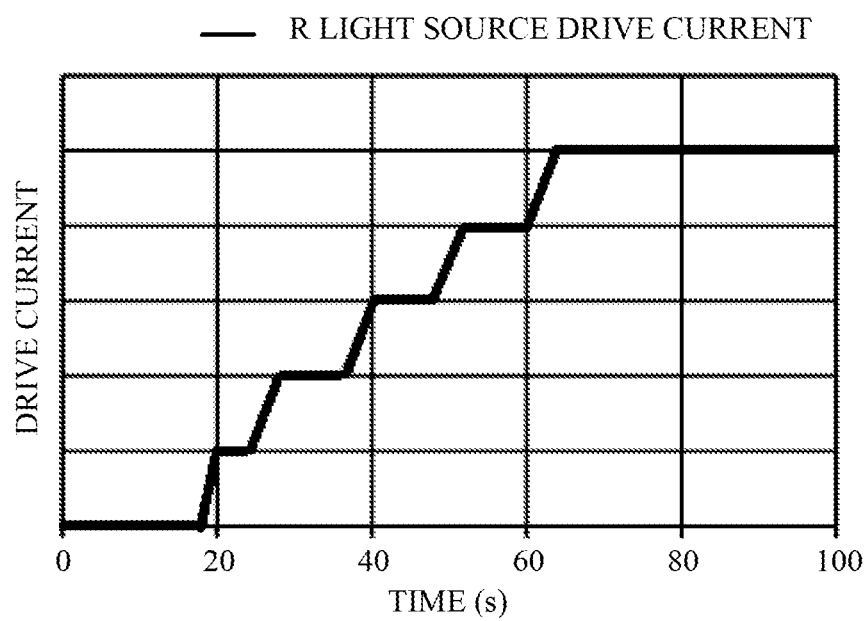

If the temperature of the R light source 5rd is high, the time to increase the drive current is made earlier, and if the temperature of the R light source 5rd is low, the time to increase the drive current is delayed. This is because when the temperature of the R light source 5rd is low, the high drive current is likely to generate the COD caused by the light emission, so increasing the drive current is delayed and the light emission amount is gradually increased. Thereby, the high drive current is prevented from flowing until the temperature of the R light source 5rd rises (FIG. 17A). On the other hand, when the temperature of the R light source 5rd is high, the COD caused by the light emission is unlikely to occur even if a high drive current is supplied and thus the time to increase the drive current is made earlier so that the drive current can reach the set drive current value as soon as possible (FIG. 17B).

In S98, the drive current of the R light source 5rd is increased at time calculated in S97. As a result, when the drive current of the R light source 5rd reaches the set value in S95, the system controller 1 ends this processing.

This embodiment changes the time to increase the drive current supplied to the R light source 5rd according to the temperature of the R light source 5rd, thereby more reliably suppressing the COD and accelerating the time required to increase the drive current of the R light source 5rd to the set value.

Twelfth Embodiment

Figure 18:
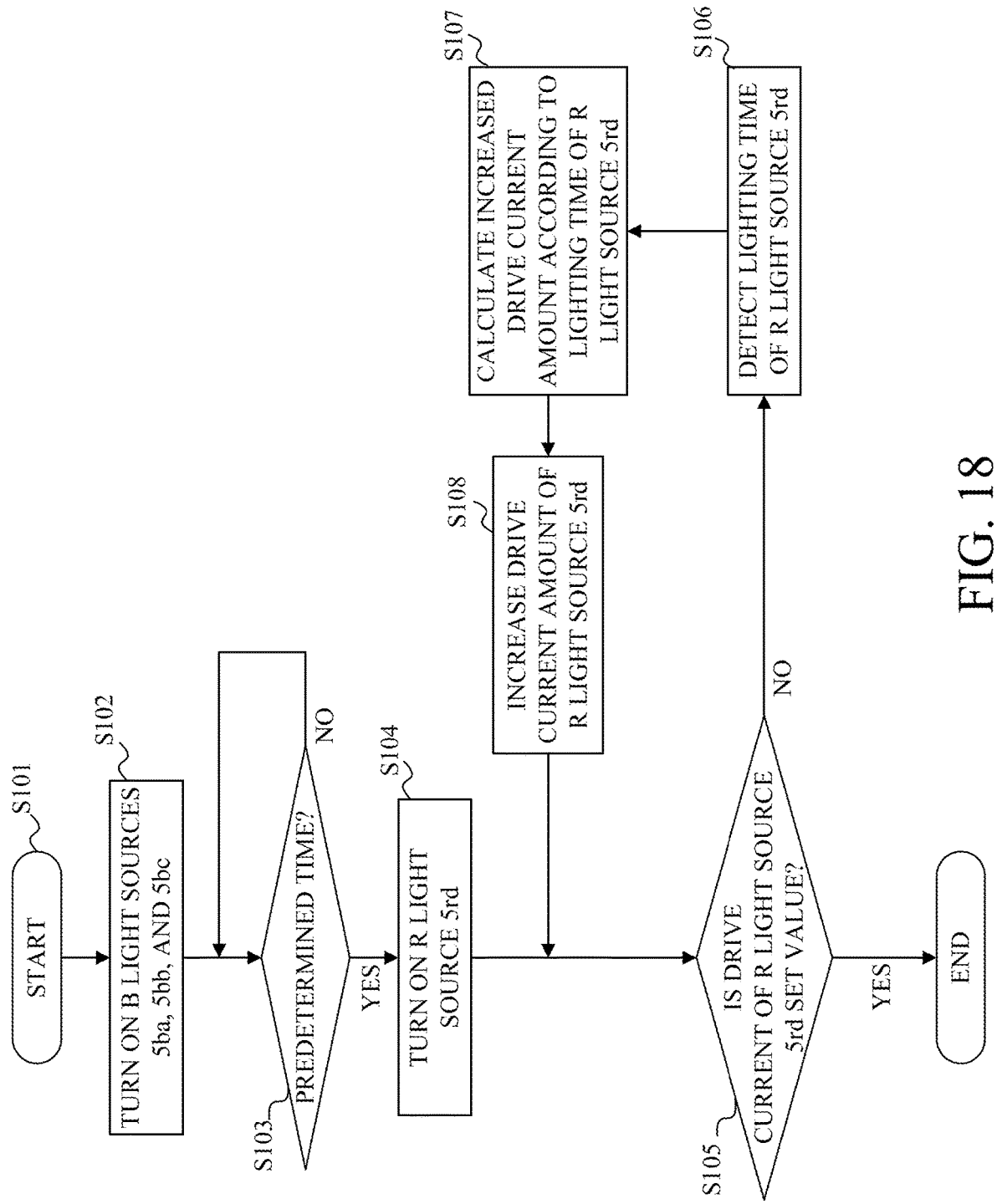
FIG. 18 is a flowchart showing light source lighting processing performed by a projector according to a twelfth embodiment of the present invention.

A description will be given of a twelfth embodiment according to the present invention. A configuration of a projector according to the twelfth embodiment is the same as that of the projector in the first embodiment. A flowchart of FIG. 18 illustrates light source lighting processing performed by the system controller 1 according to this embodiment.

When the user turns on the projector by operating the power button provided on the projector or the power button provided on the remote controller, the system controller 1 starts this processing in S101.

Next, in S102, the system controller 1 supplies the drive current of the set value calculated by the drive current calculator 3 to each of the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S103, the system controller 1 determines whether or not a predetermined time has elapsed after turning on the B light sources 5ba, 5bc, and 5bc. The predetermined time is the same as that in the first embodiment. If the predetermined time has not elapsed, the system controller 1 repeats the determination in S103. If the predetermined time has elapsed, the flow proceeds to S104.

In S104, the system controller 1 supplies the drive current calculated by the drive current calculator 3 to the R light source 5rd via the light source driver 4 to turn on it. Then, the system controller 1 gradually increases the drive current supplied to the R light source 5rd in a stepwise manner via the drive current calculator 3. In other words, the drive current supplied to the R light source 5rd is increased to the set value by taking time longer than that necessary to supply the drive current of the set value to each of the B light sources 5ba, 5bb, and 5bc in S102.

Then, the increase amount of the drive current is made variable according to the lighting time of the R light source 5rd.

In S105, it is confirmed whether the drive current of the R light source 5rd has reached the set value, and if not, the accumulated lighting time of the R light source 5rd is detected in S106. In S107, an increase amount of the drive current is determined according to the accumulated lighting time of the R light source 5rd.

If the accumulated lighting time of the R light source 5rd is long, the increase amount of the drive current is made larger, and if the accumulated lighting time of the R light source 5rd is short, the increase amount of the drive current is made smaller. This is because the light emitting efficiency of the R light source 5rd is high when the accumulated lighting time of the R light source 5rd is short, and the intensified light is emitted with a high drive current. Since the COD caused by the light emission is likely to occur, the increase amount of the drive current is reduced and the light emission amount is gradually increased so as to prevent the high drive current from flowing until the temperature of the R light source 5rd rises (FIG. 15A). On the other hand, if the accumulated lighting time of the R light source 5rd is long, the light emitting efficiency of the R light source 5rd is low, and the intensified light is not emitted even with a high drive current. Since the COD caused by the light emission is hard to occur, the increase amount of the drive current is made larger so that the drive current can reach the set drive current value as soon as possible (FIG. 15B).

In S108, the drive current of the R light source 5rd is increased by the amount obtained in S107. As a result, when the drive current of the R light source 5rd reaches the set value in S105, the system controller 1 ends this processing.

This embodiment changes the drive current supplied to the R light source 5rd according to the accumulated lighting time of the R light source 5rd, thereby more reliably suppressing the COD or accelerating the time required to increase the drive current of the R light source 5rd up to the set value.

Thirteenth Embodiment

Figure 19:
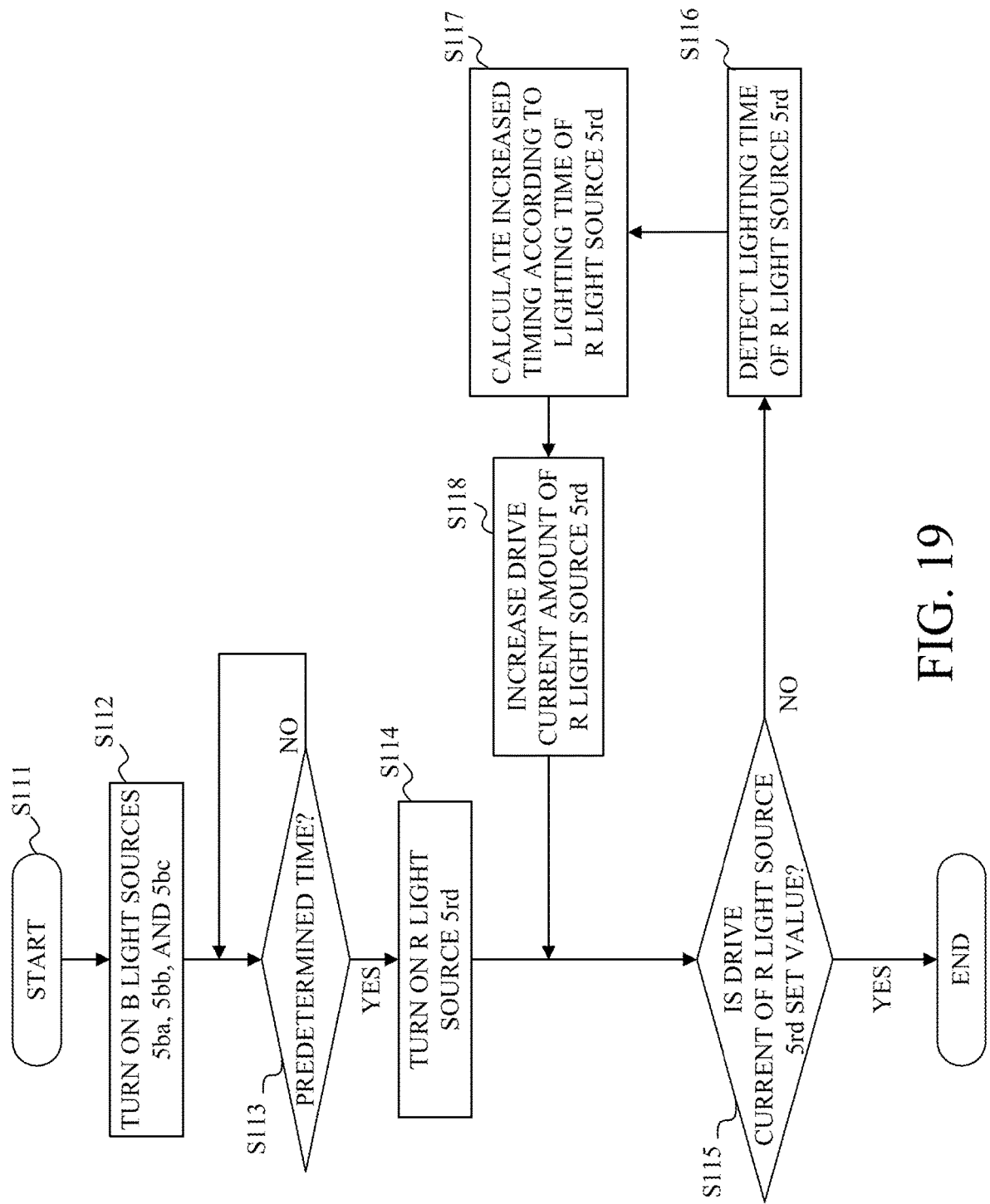
FIG. 19 is a flowchart showing light source lighting processing performed by a projector according to a thirteenth embodiment of the present invention.

A description will be given of a thirteenth embodiment according to the present invention. A configuration of the projector according to the thirteenth embodiment is the same as that of the projector in the first embodiment. A flowchart of FIG. 19 illustrates light source lighting processing performed by the system controller 1 according to this embodiment.

When the user turns on the projector by operating the power button provided on the projector or the power button provided on the remote controller, the system controller 1 starts this processing in S111.

Next, in S112, the system controller 1 supplies the drive current of the set value calculated by the drive current calculator 3 to each of the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S113, the system controller 1 determines whether or not a predetermined time has elapsed after the B light sources 5ba, 5bc, and 5bc are turned on. The predetermined time is the same as that in the first embodiment. If the predetermined time has not elapsed, the system controller 1 repeats the determination in S113, and if the predetermined time has elapsed, the flow proceeds to S114.

In S114, the system controller 1 supplies the drive current calculated by the drive current calculator 3 to the R light source 5rd via the light source driver 4 to turn on it. Then, the system controller 1 gradually increases the drive current supplied to the R light source 5rd in a stepwise manner via the drive current calculator 3. The drive current supplied to the R light source 5rd is increased up to the set value by taking time longer than that necessary to supply the drive current of the set value to each of the B light sources 5ba, 5bb, and 5bc in S112.

In S115, the system controller 1 determines whether the drive current of the R light source 5rd has reached the set value, and if not, detects the accumulated lighting time of the R light source 5rd in S116. In S117, the system controller 1 determines the time to increase the drive current according to the accumulated lighting time of the R light source 5rd.

If the accumulated lighting time of the R light source 5rd is long, the time to increase the drive current is made earlier, and if the accumulated lighting time of the R light source 5rd is short, the time to increase the drive current is delayed. This is because when the accumulated lighting time of the R light source 5rd is short, a high drive current causes intensified light to be emitted. Since the COD caused by the light emission is likely to occur, increasing the drive current is delayed and the light emission amount is gradually increased so as to prevent a high drive current from flowing until the temperature of the R light source 5rd rises (FIG. 17A). On the other hand, if the accumulated lighting time of the R light source 5rd is long, even if a high drive current is supplied, the intensified light is not emitted. Since the COD caused by the light emission is unlikely to occur, the time to increase the drive current can be made earlier so that the drive current can reach the set drive current value as soon as possible (FIG. 17B).

In S118, the drive current of the R light source 5rd is increased at time calculated in S117. As a result, when the drive current of the R light source 5rd reaches the set value in S115, the system controller 1 ends this processing.

This embodiment changes the time when the drive current supplied to the R light source 5rd is increased according to the accumulated lighting time of the R light source 5rd to more reliably suppress the COD or to accelerate the time required to increase the drive current of the R light source 5rd up to the set value.

Fourteenth Embodiment

Figure 20:
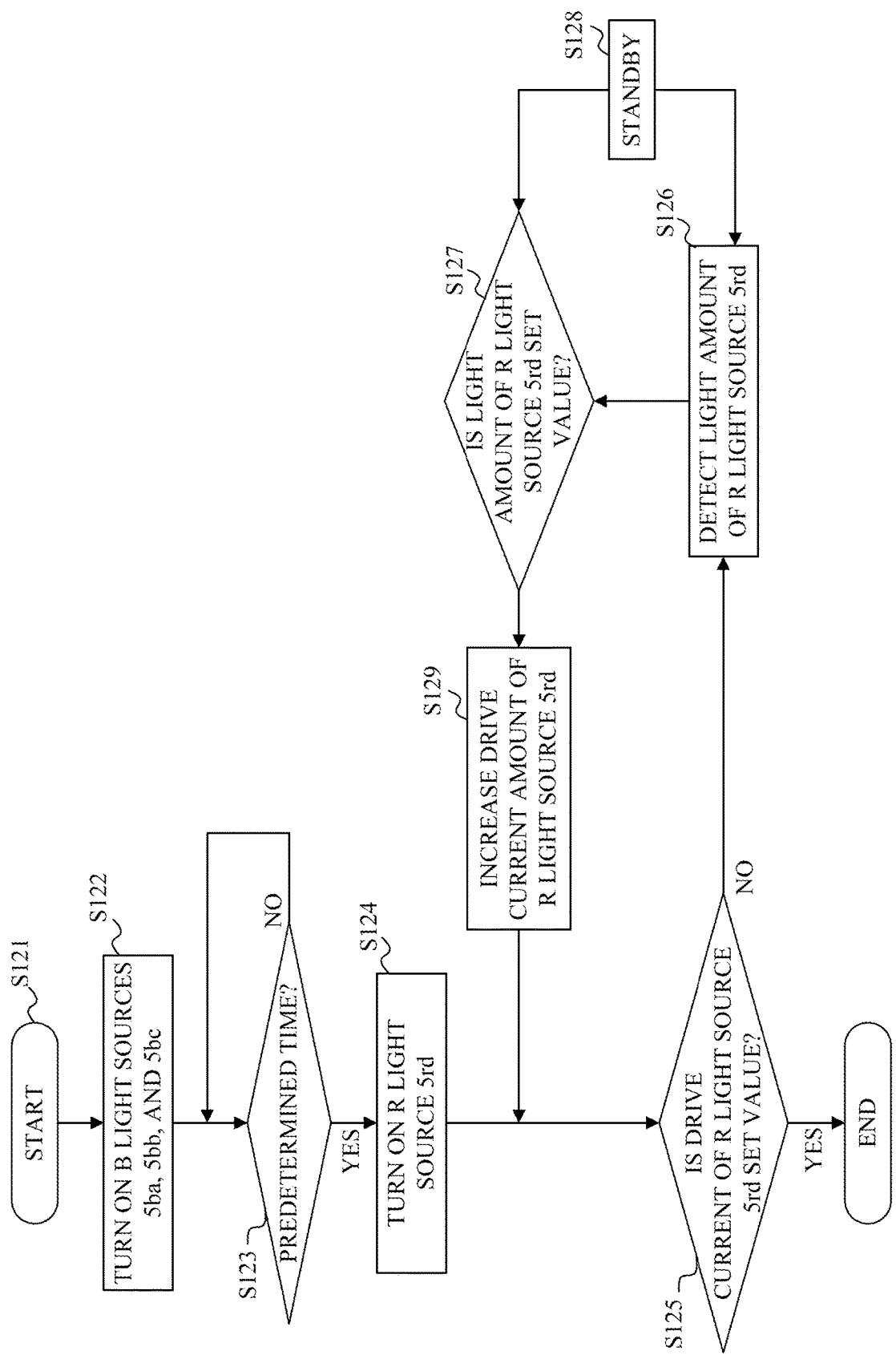
FIG. 20 is a flowchart showing light source lighting processing performed by a projector according to a fourteenth embodiment of the present invention.

A fourteenth embodiment of the present invention will now be described. A configuration of the projector according to the fourteenth embodiment is the same as that of the projector in the first embodiment. A flowchart of FIG. 20 illustrates light source lighting processing performed by the system controller 1 according to this embodiment.

When the user turns on the projector by operating the power button provided on the projector or the power button provided on the remote controller, the system controller 1 starts this processing in S121.

Next, in S122, the system controller 1 supplies the drive current of the set value calculated by the drive current calculator 3 to the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S123, the system controller 1 determines whether or not a predetermined time has elapsed after the B light sources 5ba, 5bc, and 5bc are turned on. The predetermined time is the same as that in the first embodiment. If the predetermined time has not elapsed, the system controller 1 repeats the determination in S13. If the predetermined time has elapsed, the flow proceeds to S124.

In S124, the system controller 1 supplies the drive current calculated by the drive current calculator 3 to the R light source 5rd via the light source driver 4 to turn on it. Then, the system controller 1 gradually increases the drive current supplied to the R light source 5rd in a stepwise manner via the drive current calculator 3. In other words, the drive current supplied to the R light source 5rd is increased up to the set value by taking time longer than that necessary for supplying the drive current of the set value to each of the B light sources 5ba, 5bb, and 5bc in S122.

In S126, the light amount of the R light source 5rd is detected. In S127, the system controller 1 determines whether the light amount of the R light source 5rd has reached the set value. If not, the R light source 5rd continues to light in S128 and stands by, and when the temperature of the R light source 5rd rises, the system controller 1 reduces the light amount of the R light source 5rd and determines whether the light amount of the R light source 5rd has reached the set value again in S127.

On the other hand, when the light amount of the R light source 5rd reaches the set value in S127, the drive current of the R light source 5rd is increased in S127.

Figure 21:
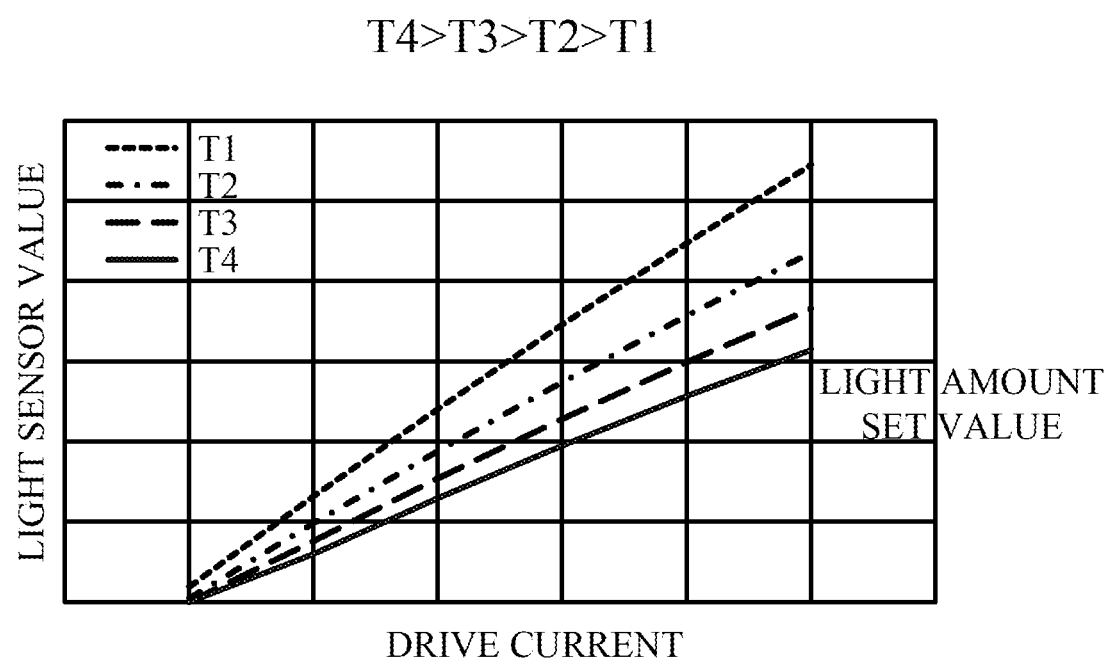
FIG. 21 illustrates a relationship between a light sensor value and a drive current of a light source according to the fourteenth embodiment.

A relationship between a light sensor value and the drive current when the temperature of the R light source 5rd is in a steady state for a product is recorded as a set value in the main body. FIG. 21 illustrates the relationship between the light sensor value and the drive current of the R light source 5rd. As described in FIG. 21, when the temperature of the R light source 5rd is high, the light sensor value when the same drive current is supplied is low. When the light source is turned on, the light amount of the R light source 5rd is compared with the set value, and if the light amount is higher than the set value, it is determined that the temperature of the R light source 5rd is low, and the process stands by without increasing the drive current. If the light amount of the R light source 5rd approximately accords with the set value, it is determined that the temperature of the R light source 5rd has reached the steady state and the drive current is increased. This is because while the temperature of the R light source 5rd is low, a high drive current is likely to generate the COD caused by the light emission and thus the high drive current is prevented from flowing until the temperature of the R light source 5rd rises. Then, when the temperature of the R light source 5rd reaches the steady state, the COD caused by the light emission is unlikely to occur even if a high drive current flows and thus the drive current can be set to a set value. As a result, the drive current can reach the set drive current value as soon as possible.

When the drive current of the R light source 5rd reaches the set value in S115, the system controller 1 ends this processing.

This embodiment changes the drive current supplied to the R light source 5rd according to the relationship between the light amount and the drive current of the R light source 5rd, thereby more reliably suppressing the COD or accelerating the time required to increase the drive current of the R light source 5rd up to the set drive current value.

Fifteenth Embodiment

Figure 22:
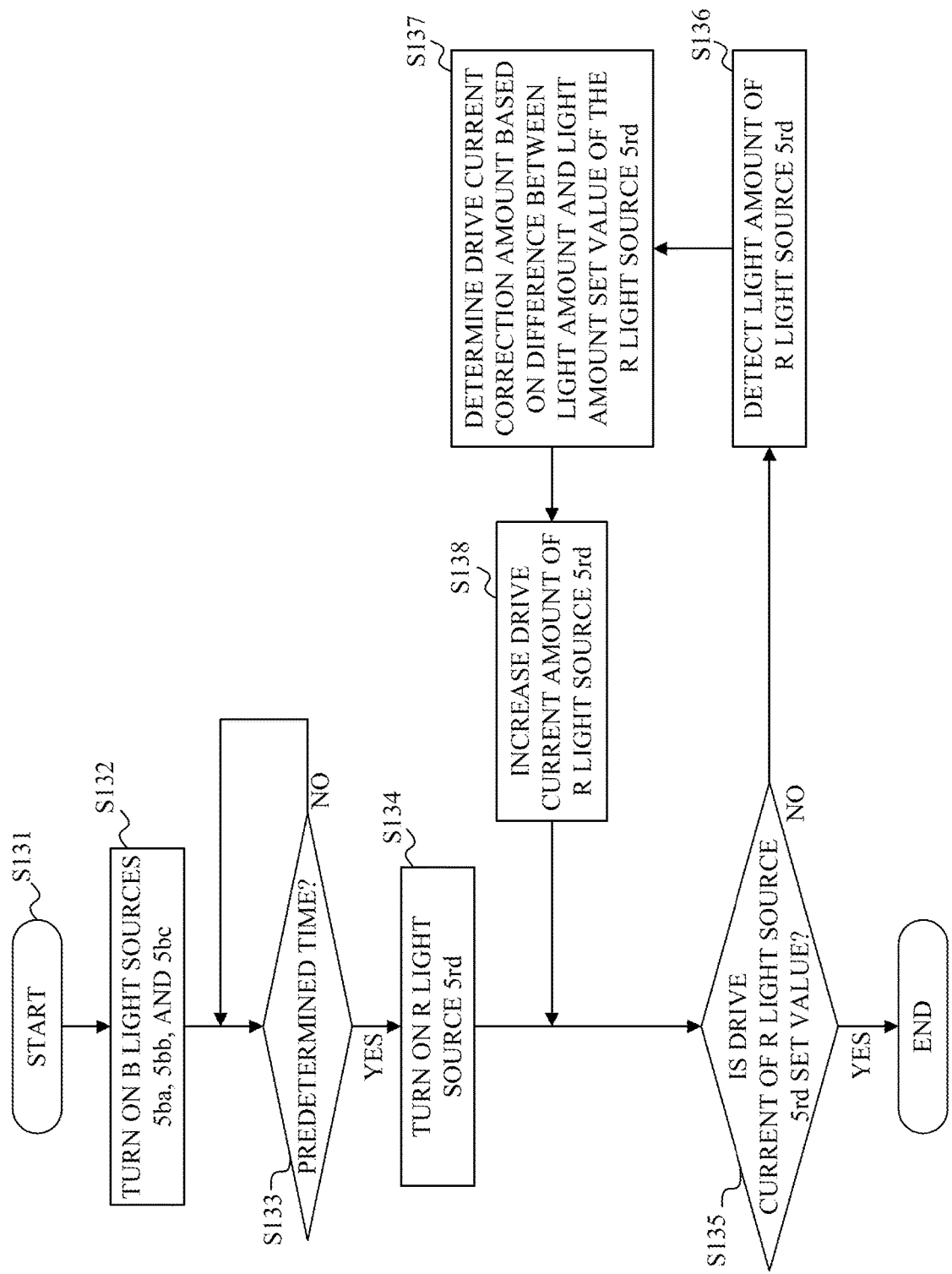
FIG. 22 is a flowchart showing light source lighting processing performed by a projector according to a fifteenth embodiment of the present invention.

Next follows a description of a fifteenth embodiment according to the present invention. A configuration of the projector according to the fifteenth embodiment is the same as that of the projector in the first embodiment. A flowchart of FIG. 22 illustrates light source lighting processing performed by the system controller 1 according to this embodiment.

When the user turns on the projector by operating the power button provided on the projector or the power button provided on the remote controller, the system controller 1 starts this processing in S131.

Next, in S132, the system controller 1 supplies the drive current of the set value calculated by the drive current calculator 3 to each of the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S133, the system controller 1 determines whether or not a predetermined time has elapsed after the B light sources 5ba, 5bc, and 5bc are turned on. The predetermined time is the same as that in the first embodiment. If the predetermined time has not elapsed, the system controller 1 repeats the determination in S133. If the predetermined time has elapsed, the flow proceeds to S134.

In S134, the system controller 1 supplies the drive current calculated by the drive current calculator 3 to the R light source 5rd via the light source driver 4 to turn on it. Then, the system controller 1 gradually increases the drive current supplied to the R light source 5*rd* in a stepwise manner via the drive current calculator 3. In other words, the drive current supplied to the R light source 5*rd* is increased up to the set value by taking time longer than that necessary to supply the drive current of the set value to each of the B light sources 5*ba*, 5*bb*, and 5*bc* in S132.

The system controller 1 determines in S135 whether the drive current of the R light source 5*rd* has reached the set value, and if not, detects the light amount of the R light source 5*rd* in S136. In S137, the system controller 1 calculates an increase amount of the drive current according to the light amount of the R light source 5*rd*.

Figure 23:
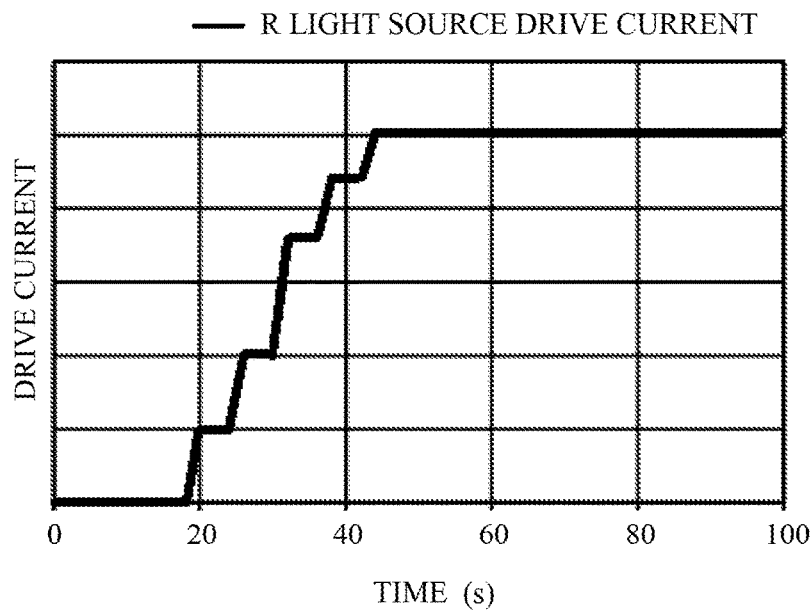
FIG. 23 illustrates a relationship between drive current and time according to the fifteenth embodiment of the present invention.

A relationship between the light sensor value (light amount) and the drive current when the temperature of the R light source 5*rd* is in a steady state for a product is recorded as a set value in the main body. FIG. 23 illustrates the relationship between the light sensor value and the drive current of the R light source 5*rd*. As described in FIG. 23, when the temperature of the R light source 5*rd* is high, the light sensor value when the same drive current is supplied is low. When the light source is turned on, the light amount of the R light source 5*rd* is compared with the set value, and if the difference from the set value is large, it is determined that the temperature of the R light source 5*rd* is low and the increase amount of the drive current is reduced. The light amount of the R light source 5*rd* is compared with the set value, and if the difference from the set value is small, the system controller 1 determines that the temperature of the R light source 5*rd* has reached a high temperature close to the steady state, and increases the increase amount of the drive current. This is because while the temperature of the R light source 5*rd* is low, a high drive current is likely to generate the COD caused by the light emission and thus the high drive current is prevented from flowing until the temperature of the R light source 5*rd* rises. When the temperature of the R light source 5*rd* reaches a temperature close to the steady state, the COD caused by the light emission is unlikely to occur even if a high drive current flows and the drive current can be drastically changed to the set value. As a result, the drive current can reach the set drive current value as soon as possible. FIG. 23 illustrates a transition of the drive current in the lighting of this invention.

In S138, the drive current of the R light source 5*rd* is increased by the amount calculated in S137. As a result, when the drive current of the R light source 5*rd* reaches the set value in S135, the system controller 1 ends this processing.

This embodiment changes the drive current supplied to the R light source 5*rd* according to the relationship between the light amount and the drive current of the R light source 5*rd*, thereby more reliably suppressing the COD and to accelerating the time required to increase the drive current of the R light source 5*rd* up to the set drive current value.

Sixteenth Embodiment

Figure 24:
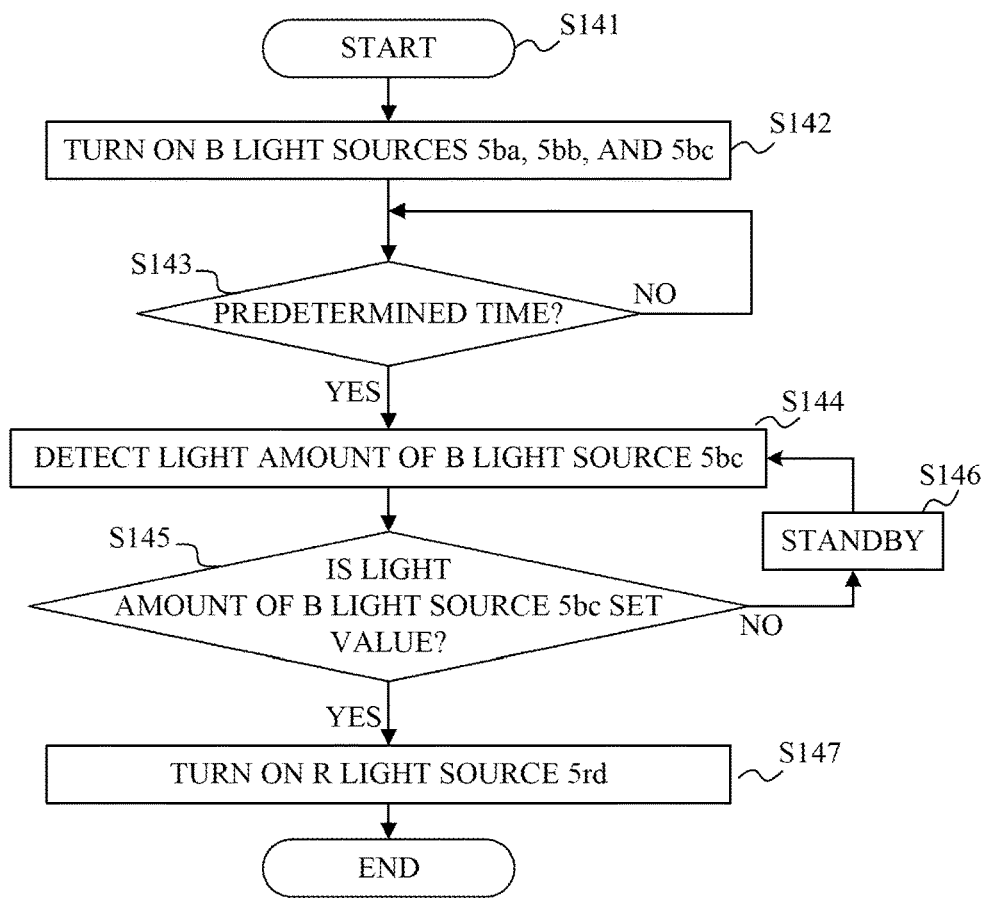
FIG. 24 is a flowchart showing light source lighting processing performed by a projector according to a sixteenth embodiment of the present invention.

Next follows a description of a sixteenth embodiment according to the present invention. A configuration of the projector according to the sixteenth embodiment is the same as that of the projector in the first embodiment. A flowchart of FIG. 24 illustrates light source lighting processing performed by the system controller 1 according to this embodiment.

When the user turns on the projector by operating the power button provided on the projector or the power button provided on the remote controller, the system controller 1 starts this processing in S141.

Next, in S142, the system controller 1 supplies the drive current of the set value calculated by the drive current calculator 3 to each of the B light sources 5*ba*, 5*bb*, and 5*bc* via the light source driver 4 to turn on them. As a result, as illustrated in FIG. 3, the heat generated from the lit B light source 5*bc* transmits through the BR light source heat sink 6*r* and reaches the R light source 5*rd* to raise the temperature of the R light source 5*rd*.

Next, in S143, the system controller 1 determines whether or not a predetermined time has elapsed after the B light sources 5*ba*, 5*bc*, and 5*bc* are turned on. The predetermined time is the same as that in the first embodiment. If the predetermined time has not elapsed, the system controller 1 repeats the determination in S143, and if the predetermined time has elapsed, the flow proceeds to S144.

A relationship between the light sensor value (light amount) and the drive current when the temperature of the B light source 5*bc* is in a steady state for a product is recorded as a set value on the main body when the projector is manufactured.

Next, in S144, the system controller 1 turns on the B light sources 5*ba*, 5*bc*, and 5*bc*, and then detects the light amount of the B light source 5*bc*. In S145, the system controller 1 compares the light amount of the B light source 5*bc* with the set value when the light source is lit, and if the light amount is higher than the set value, the system controller 1 determines that the temperature of the R light source 5*rd* is low and stands by without increasing the drive current in S146. If the light amount of the B light source 5*bc* substantially accords with the set value, the flow proceeds to S147, the system controller 1 determines that the temperature of the R light source 5*rd* has reached the steady state, and turns on the R light source 5*rd*.

This is because the heat generated from the lit B light source 5*bc* transmits to the BR light source heat sink 6*r* and reaches the R light source 5*rd* to raise the temperature of the R light source 5*rd*, and thus the temperature of the light source 5*rd* can be indirectly recognized by detecting the light amount of the B light source 5*bc*.

When the temperature of the R light source 5*rd* is low, a high drive current is likely to generate the COD caused by the light emission and thus the high drive current is prevented from flowing until the temperature of the R light source 5*rd* rises. When the temperature of the R light source 5*rd* reaches the steady state, the COD caused by the light emission is unlikely to occur even if a high drive current flows, so that the set drive current can be supplied to the R light source 5*rd*. As a result, the drive current can reach the set drive current value as soon as possible.

This embodiment changes the drive current supplied to the R light source 5*rd* according to the relationship between the light amount and the drive current of the B light source, thereby more reliably suppressing the COD and accelerating the time required to increase the drive current of the R light source 5*rd* to a set value.

Seventeenth Embodiment

Figure 25:
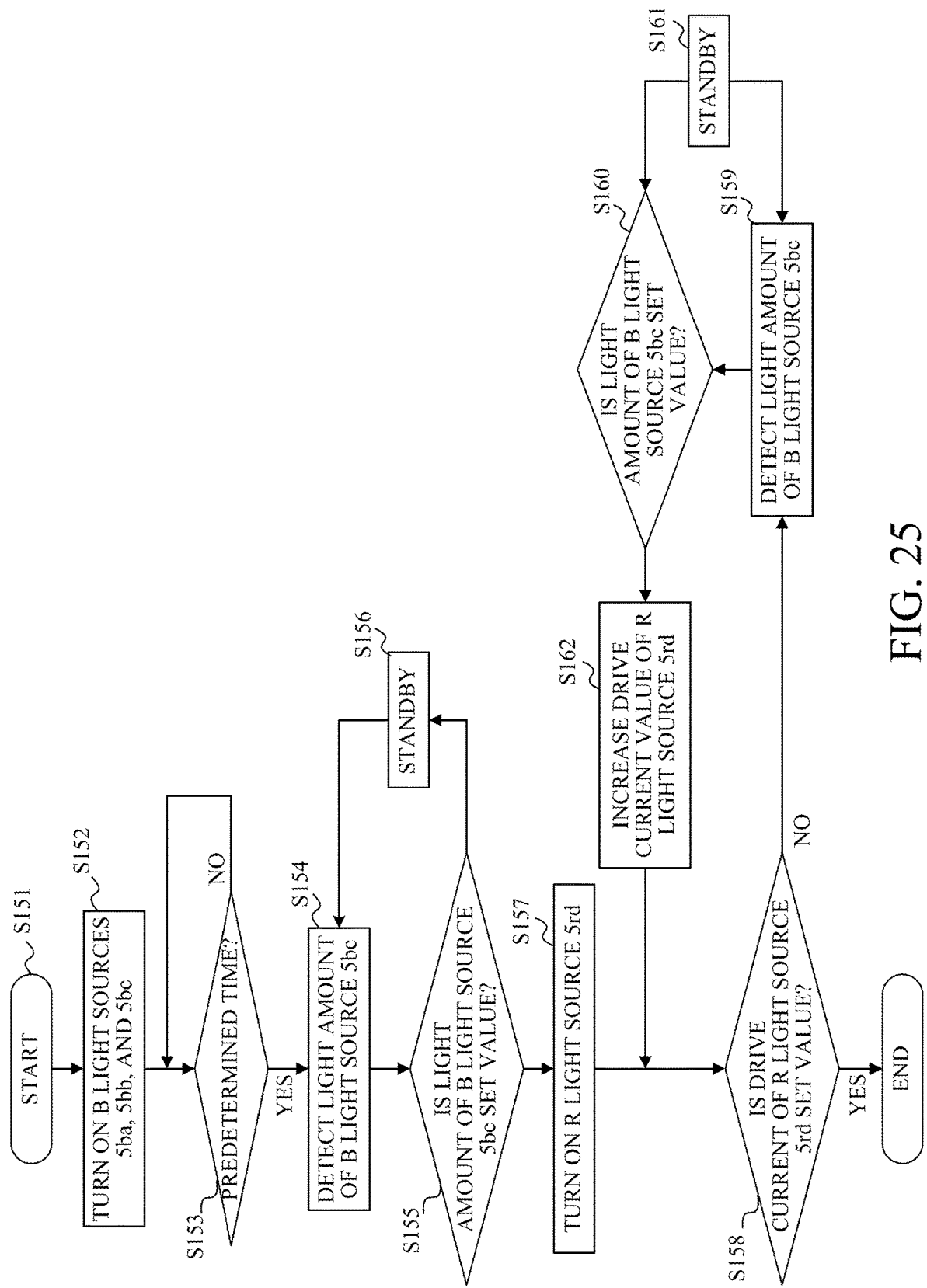
FIG. 25 is a flowchart showing light source lighting processing performed by a projector according to a seventeenth embodiment of the present invention.

Next follows a description of a seventeenth embodiment according to the present invention. A configuration of the projector according to the seventeenth embodiment is the same as that of the projector in the first embodiment. A flowchart of FIG. 25 illustrates light source lighting processing performed by the system controller 1 according to this embodiment.

When the user turns on the projector by operating the power button provided on the projector or the power button provided on the remote controller, the system controller 1 starts this processing in S151.

Next, in S152, the system controller 1 supplies the drive current of the set value calculated by the drive current calculator 3 to each of the B light sources 5ba, 5bb, and 5bc via the light source driver 4 to turn on them. As a result, as illustrated in FIG. 3, the heat generated from the lit B light source 5bc transmits through the BR light source heat sink 6r and reaches the R light source 5rd to raise the temperature of the R light source 5rd.

Next, in S153, the system controller 1 determines whether or not a predetermined time has elapsed after the B light sources 5ba, 5bc, and 5bc are turned on. The predetermined time is the same as that in the first embodiment. If the predetermined time has not elapsed, the system controller 1 repeats the determination in S153. If the predetermined time has elapsed, the flow proceeds to S154.

A relationship between the light sensor value and the drive current when the temperature of the B light source 5bc is in a steady state for a product is recorded as a set value on the main body when the projector is manufactured.

In S154, the system controller 1 turns on the B light sources 5ba, 5bc, and 5bc, and then detects the light amount of the B light source 5bc. The system controller 1 compares the light amount of the B light source 5bc with the set threshold value at the light source lighting time in S154, and if the light amount is higher than the threshold value, the system controller 1 determines that the temperature of the R light source 5rd is low, and stands by without turning on the drive current in S156. If the light amount of the B light source 5bc substantially accords with the threshold value, the system controller 1 proceeds to S157 to determine that the temperature of the R light source 5rd has risen and to turn on the R light source 5rd.

This is because the heat generated from the lit B light source 5bc transmits to the BR light source heat sink 6r and reaches the R light source 5rd to raise the temperature of the R light source 5rd, and thus the temperature of the light source 5rd can be indirectly recognized by detecting the light amount of the B light source 5bc.

The drive current supplied to the lit R light source 5rd is a value lower than the set drive current for the R light source 5rd. This is because while the temperature of the R light source 5rd is low, a high drive current is likely to generate the COD caused by the light emission and thus the high drive current is prevented from flowing until the temperature of the R light source 5rd rises.

The system controller 1 determines in S158 whether the drive current of the R light source 5rd has reached the set value, and if not, detects the light amount of the B light source 5bc in S159. The system controller 1 compares the light amount of the B light source 5bc with the set value in S160, and if the light amount is higher than the set value, the system controller 1 determines that the temperature of the R light source 5rd is low, and stands by without increasing the drive current in S161. If the light amount of the R light source 5rd substantially accords with the set value, the system controller 1 determines that the temperature of the R light source 5rd has reached the steady state, and increases the drive current in S162.

This is because the heat generated from the lit B light source 5bc transmits to the BR light source heat sink 6r and reaches the R light source 5rd to raise the temperature of the R light source 5rd, and thus the temperature of the light source 5rd can be indirectly recognized by detecting the light amount of the B light source 5bc.

While the temperature of the R light source 5rd is low, a high drive current is likely to generate the COD caused by the light emission and the high drive current is prevented from flowing until the temperature of the R light source 5rd rises. When the temperature of the R light source 5rd reaches the steady state, the COD caused by the light emission is unlikely to occur even if a high drive current flows, so the drive current can be set to the set value. As a result, the drive current can reach the set drive current value as soon as possible.

When the drive current of the R light source 5rd reaches the set value, the system controller 1 ends this processing.

This embodiment changes the drive current supplied to the R light source 5rd according to the relationship between the light amount and the drive current of the B light source, thereby more reliably suppressing the COD and accelerating the time required to increase the drive current of the R light source 5rd up to a set value.

Each embodiment can realize a light source apparatus and an image projection apparatus including the light source apparatus, which can suppress the COD in a second solid light source.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-158593, filed on Aug. 27, 2018, which is hereby incorporated by reference herein in its entirety.

What is claimed is:

1. A light source apparatus comprising:
a first solid state light source;
a second solid state light source configured to emit light with a wavelength different from that of the first solid state light source; and
a controller configured to control turning on the first and second solid state light sources,
wherein the first solid state light source and the second solid state light source are connected by a heat conductive member,
wherein the controller turns on the second solid state light source after a predetermined time elapses after turning on the first solid state light source, or
the controller turns on the second solid state light source after a temperature of the first or second solid state light source rises to a predetermined temperature after turning on the first solid state light source, and
wherein the controller increases a drive current of the second solid state light source up to a set value by taking time longer than that used for a drive current of the first solid state light source to increase up to a set value.

2. The light source apparatus according to claim 1, further comprising a cooler configured to cool the second solid state light source,
wherein the controller instructs the cooler to start cooling the second solid state light source after or as soon as the drive current of the second solid state light source increases up to the set value.

3. The light source apparatus according to claim 1, wherein the controller controls turning on the first solid state light source so that the drive current of the first solid state light source becomes higher than the set value and then becomes the set value.

4. The light source apparatus according to claim 1, wherein the second solid state light source has a wavelength longer than that of the first solid state light source.

5. The light source according to claim 4, wherein the first solid state light source emits blue light, and the second solid state light source emits red light.

6. A light source apparatus comprising:
a first solid state light source;
a second solid state light source configured to emit light with a wavelength different from that of the first solid state light source; and
a controller configured to control a drive current for turning on each of the first and second solid state light sources,
wherein the first solid state light source and the second solid state light source are connected by a heat conductive member, and
wherein in turning on the first and second solid state light sources, the controller increases the drive current of the second solid state light source to a set value by taking time longer than that used for the drive current of the first solid state light source to increase up to the set value.

7. An image projection apparatus comprising a light source apparatus, and a light modulator configured to modulate light from the light source apparatus, the image projection apparatus being configured to project light from the light modulator onto a projection surface to display an image,
wherein the light source apparatus includes:
a first solid state light source;
a second solid state light source configured to emit light with a wavelength different from that of the first solid state light source; and
a controller configured to control turning on the first and second solid state light sources,
wherein the first solid state light source and the second solid state light source are connected by a heat conductive member,
wherein the controller turns on the second solid state light source after a predetermined time elapses after turning on the first solid-state light source, or
the controller turns on the second solid state light source after a temperature of the first or second solid state light source rises to a predetermined temperature after turning on the first solid state light source, and
wherein the controller increases a drive current of the second solid state light source up to a set value by taking time longer than that used for a drive current of the first solid state light source to increase up to a set value.

8. The image projection apparatus according to claim 7, wherein while the first solid state light source is turned on before the second solid state light source is turned on, the light modulator is controlled to an all-black display state regardless of an input image signal, and
wherein the light modulator is controlled according to the input image signal in turning on the second solid state light source.

9. The image projection apparatus according to claim 7, further comprising a shutter provided on an optical path of light traveling from the light source apparatus to the light modulator,
wherein the shutter is controlled to be closed while the first solid state light source is turned on before the second solid state light source is turned on, and the shutter is controlled to be opened when the second solid state light source is turned on.

10. An image projection apparatus comprising a light source apparatus, and a light modulator configured to modulate light from the light source apparatus, the image projection apparatus being configured to project light from the light modulator onto a projection surface to display an image,
wherein the light source apparatus includes:
a first solid state light source;
a second solid state light source configured to emit light with a wavelength different from that of the first solid state light source; and
a controller configured to control a drive current for turning on each of the first and second solid state light sources,
wherein the first solid state light source and the second solid state light source are connected by a heat conductive member, and
wherein in turning on the first and second solid state light sources, the controller increases the drive current of the second solid state light source to a set value by taking time longer than that used for the drive current of the first solid state light source to increase up to the set value.

11. A control method for a light source apparatus including a first solid state light source, and a second solid state light source configured to emit light with a wavelength different from that of the first solid state light source, the control method comprising the steps of:

turning on the first solid state light source; and turning on the second solid state light source after a predetermined time elapses after turning on the first solid state light source, or turning on the second solid state light source after a temperature of the first or second solid state light source rises to a predetermined temperature after turning on the first solid state light source, wherein the first solid state light source and the second solid state light source are connected by a heat conductive member, wherein a drive current of the second solid state light source increases up to a set value by taking time longer than that used for a drive current of the first solid state light source to increase up to a set value.

12. A control method for a light source apparatus including a first solid state light source, and a second solid state light source configured to emit light with a wavelength different from that of the first solid state light source, the control method comprising the step of controlling a drive current for turning on each of the first and second solid state light sources, wherein in turning on the first and second solid state light sources, the controlling step increases the drive current of the second solid state light source up to a set value by taking time longer than that used for the drive current of the first solid state light source to increase up to the set value, wherein the first solid state light source and the second solid state light source are connected by a heat conductive member.

13. A non-transitory computer-readable storage medium storing a program that causes a computer to execute a control method of a light source apparatus including a first solid state light source, and a second solid state light source configured to emit light with a wavelength different from that of the first solid state light source, wherein the control method includes the steps of:

turning on the first solid state light source; and turning on the second solid state light source after a predetermined time elapses after turning on the first solid state light source, or turning on the second solid state light source after a temperature of the first or second solid state light source rises to a predetermined temperature after turning on the first solid state light source, wherein the first solid state light source and the second solid state light source are connected by a heat conductive member, and wherein a drive current of the second solid state light source increases up to a set value by taking time longer than that used for a drive current of the first solid state light source to increase up to a set value.

14. A non-transitory computer-readable storage medium storing a program that causes a computer to execute a control method of a light source apparatus including a first solid state light source, and a second solid state light source configured to emit light with a wavelength different from that of the first solid state light source, wherein the control method includes the step of controlling a drive current for turning on each of the first and second solid state light sources, wherein in turning on the first and second solid state light sources, the controlling step increases the drive current of the second solid state light source up to a set value by taking time longer than that used for the drive current of the first solid state light source to increase up to the set value, wherein the first solid state light source and the second solid state light source are connected by a heat conductive member.

15. A light source apparatus comprising:

a first solid state light source;

a second solid state light source configured to emit light with a wavelength different from that of the first solid state light source; and a controller configured to control the first and second solid state light sources, wherein the controller turns on the second solid state light source after a temperature of the first or second solid state light source rises to a predetermined temperature after turning on the first solid state light source.

16. The light source apparatus according to claim 15, further comprising a heat conductive member, wherein the first solid state light source and the second solid state light source are connected by the heat conductive member.

17. The light source apparatus according to claim 15, further comprising a cooler configured to cool the second solid state light source, wherein the controller instructs the cooler to start cooling the second solid state light source after or as soon as the drive current of the second solid state light source increases up to the set value.

18. The light source apparatus according to claim 15, wherein the controller increases a drive current of the second solid state light source up to a set value by taking time longer than that used for a drive current of the first solid state light source to increase up to a set value.

19. The light source apparatus according to claim 15, wherein the controller increases a drive current of the first solid state light source up to a set value by taking time longer than that used for a drive current of the second solid state light source to increase up to a set value.

20. The light source apparatus according to claim 15, wherein the controller controls turning on the first solid state light source so that the drive current of the first solid state light source becomes higher than the set value and then becomes the set value.

21. The light source apparatus according to claim 15, wherein the second solid state light source has a wavelength longer than that of the first solid state light source.

22. The light source apparatus according to claim 21, wherein the first solid state light source emits blue light, and the second solid state light source emits red light.

23. An image projection apparatus comprising a light source apparatus, and a light modulator configured to modulate light from the light source apparatus, the image projection apparatus being configured to project light from the light modulator onto a projection surface to display an image, wherein the light source apparatus includes:

a first solid state light source;

a second solid state light source configured to emit light with a wavelength different from that of the first solid state light source; and a controller configured to control the first and second solid state light sources, wherein the controller turns on the second solid state light source after a temperature of the first or second solid state light source rises to a predetermined temperature after turning on the first solid state light source.

24. The image projection apparatus according to claim 23, further comprising a heat conductive member,
wherein the first solid state light source and the second solid state light source are connected by the heat conductive member.

25. The image projection apparatus according to claim 23, wherein while the first solid state light source is turned on before the second solid state light source is turned on, the light modulator is controlled to an all-black display state regardless of an input image signal, and wherein the light modulator is controlled according to the input image signal in turning on the second solid state light source.

26. The image projection apparatus according to claim 23, further comprising a shutter provided on an optical path of light traveling from the light source apparatus to the light modulator,
wherein the shutter is controlled to be closed while the first solid state light source is turned on before the second solid state light source is turned on, and the shutter is controlled to be opened when the second solid state light source is turned on.

27. A control method for a light source apparatus including a first solid state light source, and a second solid state light source configured to emit light with a wavelength different from that of the first solid state light source, the control method comprising the steps of:
turning on the first solid state light source; and
turning on the second solid state light source after a temperature of the first or second solid state light source rises to a predetermined temperature after turning on the first solid state light source.

28. A non-transitory computer-readable storage medium storing a program that causes a computer to execute a control method of a light source apparatus including a first solid state light source, and a second solid state light source configured to emit light with a wavelength different from that of the first solid state light source,
wherein the control method includes the steps of:
turning on the first solid state light source; and
turning on the second solid state light source after a temperature of the first or second solid state light source rises to a predetermined temperature after turning on the first solid state light source.

29. A light source apparatus comprising:
a first solid state light source;
a second solid state light source configured to emit light with a wavelength different from that of the first solid state light source; and
a controller configured to control the first and second solid state light sources,
wherein the controller turns on only the first solid state light source from a state where both the first solid state light source and the second solid state light source are turned off, and then turns on the second solid state light source in a state where the first solid state light source is turned on after a predetermined time has elapsed.

30. The light source apparatus according to claim 29, further comprising a heat conductive member,
wherein the first solid state light source and the second solid state light source are connected by the heat conductive member.

31. The light source apparatus according to claim 29, wherein the controller increases a drive current of the second solid state light source up to a set value by taking time longer than that used for a drive current of the first solid state light source to increase up to a set value.

32. The light source apparatus according to claim 29, wherein the controller increases a drive current of the first solid state light source up to a set value by taking time longer than that used for a drive current of the second solid state light source to increase up to a set value.

33. The light source apparatus according to claim 29, wherein the second solid state light source has a wavelength longer than that of the first solid state light source.

34. The light source apparatus according to claim 33, wherein the first solid state light source emits blue light, and the second solid state light source emits red light.

35. An image projection apparatus comprising a light source apparatus, and a light modulator configured to modulate light from the light source apparatus, the image projection apparatus being configured to project light from the light modulator onto a projection surface to display an image,
wherein the light source apparatus includes:
a first solid state light source;
a second solid state light source configured to emit light with a wavelength different from that of the first solid state light source; and
a controller configured to control the first and second solid state light sources,
wherein the controller turns on only the first solid state light source from a state where both the first solid state light source and the second solid state light source are turned off, and then turns on the second solid state light source in a state where the first solid state light source is turned on after a predetermined time has elapsed.

36. A control method for a light source apparatus including a first solid state light source, and a second solid state light source configured to emit light with a wavelength different from that of the first solid state light source, the control method comprising the steps of:
turning on only the first solid state light source from a state where both the first solid state light source and the second solid state light source are turned off; and
turning on the second solid state light source in a state where the first solid state light source is turned on after a predetermined time has elapsed, after turning on the first solid state light source.

37. A non-transitory computer-readable storage medium storing a program that causes a computer to execute a control method of a light source apparatus including a first solid state light source, and a second solid state light source configured to emit light with a wavelength different from that of the first solid state light source,
wherein the control method includes the steps of:
turning on only the first solid state light source from a state where both the first solid state light source and the second solid state light source are turned off; and
turning on the second solid state light source in a state where the first solid state light source is turned on after a predetermined time has elapsed, after turning on the first solid state light source.

* * * * *